(12) United States Patent
Weber et al.

(10) Patent No.: US 7,216,092 B1
(45) Date of Patent: May 8, 2007

(54) INTELLIGENT PERSONALIZATION SYSTEM AND METHOD

(75) Inventors: Richard C. Weber, Stillwater, MN (US); Kevin D. Malone, Stillwater, MN (US); Krishna Narayan, Gibsonia, PA (US); Anthony F. Novalany, Afton, MN (US); David M. Belseth, Plymouth, MN (US); John J. Herlihy, Chicago, IL (US); Fred H. Squires, Hugo, MN (US); Michael N. Sax, Shoreview, MN (US); Robert W. Walsh, Mahtomedi, MN (US)

(73) Assignee: Deluxe Corporation, Shoreview, MN (US)

( * ) Notice: Subject to any disclaimer, the term of this patent is extended or adjusted under 35 U.S.C. 154(b) by 0 days.

(21) Appl. No.: 09/550,354

(22) Filed: Apr. 14, 2000

(51) Int. Cl.
*G06Q 33/00* (2006.01)
(52) U.S. Cl. .................... 705/26; 705/27; 705/37; 709/223; 707/10; 358/1.13
(58) Field of Classification Search .......... 705/26, 705/27, 37; 707/10; 358/1.13; 709/223
See application file for complete search history.

(56) References Cited

U.S. PATENT DOCUMENTS

| | | | |
|---|---|---|---|
| 4,799,156 A | 1/1989 | Shavit et al. | |
| 4,887,207 A | 12/1989 | Natarajan | |
| 4,992,940 A * | 2/1991 | Dworkin ............... | 705/26 |
| 5,029,099 A | 7/1991 | Goodman | |
| 5,053,956 A | 10/1991 | Donald et al. | |
| 5,099,422 A | 3/1992 | Foresman et al. | |
| 5,111,392 A | 5/1992 | Malin | |
| 5,168,445 A | 12/1992 | Kawashima et al. | |
| 5,287,267 A | 2/1994 | Jayaraman et al. | |

(Continued)

FOREIGN PATENT DOCUMENTS

| EP | 0 899 672 A2 * | 3/1999 |
|---|---|---|
| WO | WO 99/35551 A2 * | 7/1999 |

OTHER PUBLICATIONS

Web pages "americangreetings.com" as available to the public on Internet on Nov. 15, 1999, extracted from http://www.archive.org on Aug. 22, 2003.*

(Continued)

*Primary Examiner*—Yogesh C. Garg
(74) *Attorney, Agent, or Firm*—Knobbe Martens Olson & Bear LLP

(57) ABSTRACT

A system and method for facilitating the creation of personalized products is disclosed, wherein a user on a user computer can access a host merchant computer via a communication network, such as the Internet. The host merchant computer communicates with a products database containing information on products available for personalization and further contains manufacturing capabilities for the products. The method includes providing to the user via the communication network an assortment of product selections available in the products database, receiving a message from the user via the communication network indicating a selection of a product from the assortment, retrieving a set of manufacturing capabilities for the selected product from the products database, and providing to the user via the communication network a design interface including design tools which allow the user to select product configuration options and to create individualized enhancements, wherein the design tool is conformed to only allow configuration options and enhancements that satisfy the manufacturing capabilities.

50 Claims, 17 Drawing Sheets

U.S. PATENT DOCUMENTS

| | | | |
|---|---|---|---|
| 5,307,261 A | 4/1994 | Maki et al. | |
| 5,311,424 A | 5/1994 | Mukherjee et al. | |
| 5,347,306 A | 9/1994 | Nitta | |
| 5,440,479 A | 8/1995 | Hutton | |
| 5,450,317 A | 9/1995 | Lu et al. | |
| 5,459,656 A | 10/1995 | Fields et al. | |
| 5,491,743 A | 2/1996 | Shiio et al. | |
| 5,513,117 A | 4/1996 | Small | |
| 5,544,062 A | 8/1996 | Johnston, Jr. | |
| 5,550,746 A | 8/1996 | Jacobs | |
| 5,552,994 A | 9/1996 | Cannon et al. | |
| 5,557,780 A | 9/1996 | Edwards et al. | |
| 5,592,511 A | 1/1997 | Schoen et al. | |
| 5,615,123 A | 3/1997 | Davidson et al. | |
| 5,625,776 A | 4/1997 | Johnson | |
| 5,625,816 A | 4/1997 | Burdick et al. | |
| 5,664,111 A | 9/1997 | Nahan et al. | |
| 5,701,423 A | 12/1997 | Crozier | |
| 5,712,985 A | 1/1998 | Lee et al. | |
| 5,717,597 A | 2/1998 | Kara | |
| 5,784,568 A | 7/1998 | Needham | |
| 5,784,635 A | 7/1998 | McCallum | |
| 5,794,212 A | 8/1998 | Mistr, Jr. | |
| 5,805,846 A | 9/1998 | Nakajima et al. | |
| 5,825,651 A | 10/1998 | Gupta et al. | |
| 5,828,839 A | 10/1998 | Moncreiff | |
| 5,845,261 A | 12/1998 | McAbian | |
| 5,859,972 A | 1/1999 | Subramaniam et al. | |
| 5,864,827 A | 1/1999 | Wilson | |
| 5,870,718 A | 2/1999 | Spector | |
| 5,893,077 A | 4/1999 | Griffin | |
| 5,895,454 A | 4/1999 | Harrington | |
| 5,897,624 A | 4/1999 | Ramaswamy | |
| 5,911,131 A | 6/1999 | Vig | |
| 5,918,220 A | 6/1999 | Sansone et al. | |
| 5,920,858 A | 7/1999 | Kitabayashi et al. | |
| 5,930,768 A | 7/1999 | Hooban | |
| 5,930,769 A | 7/1999 | Rose | |
| 5,930,810 A | 7/1999 | Farros et al. | |
| RE36,360 E | 10/1999 | Costanza | |
| 5,983,203 A | 11/1999 | Church et al. | |
| 5,983,263 A | 11/1999 | Rothrock et al. | |
| 5,990,887 A | 11/1999 | Redpath et al. | |
| 5,991,732 A | 11/1999 | Moslares | |
| 5,991,770 A | 11/1999 | Zamora-McKelvy et al. | |
| 5,993,048 A | 11/1999 | Banks et al. | |
| 5,999,208 A | 12/1999 | McNerney et al. | |
| 5,999,915 A | 12/1999 | Nahan et al. | |
| 6,002,855 A | 12/1999 | Ladner et al. | |
| 6,006,192 A | 12/1999 | Cheng et al. | |
| 6,009,413 A | 12/1999 | Webber et al. | |
| 6,016,478 A | 1/2000 | Zhang et al. | |
| 6,021,396 A | 2/2000 | Ramaswamy et al. | |
| 6,125,391 A * | 9/2000 | Meltzer et al. | 709/223 |
| 6,167,383 A * | 12/2000 | Henson | 705/26 |
| 6,384,923 B1 * | 5/2002 | Lahey | 358/1.13 |
| 6,397,197 B1 * | 5/2002 | Gindlesperger | 705/37 |
| 6,473,794 B1 * | 10/2002 | Guheen et al. | 709/223 |
| 6,493,677 B1 * | 12/2002 | von Rosen et al. | 705/27 |
| 2002/0059243 A1 * | 5/2002 | Gillespie et al. | 707/10 |
| 2004/0186793 A1 * | 9/2004 | Harmand et al. | 705/27 |

OTHER PUBLICATIONS

Press release, "iPrint.com, the Leasing Online Print Shop, Offers Affordable Personalized Holiday Gifts Via the Internet", PR Newswire, p2579; Oct. 8, 1999; retrieved from Dialog Aug. 21, 2003; Dialog File 16, Dialog Accession# 067066.*

Press release, "Lycos and AmericanGreetings.com Announce Three-Year Multi-Million Dollar Strategic Alliance . . . AmericanGreetings.com Will be Exclusive Provider of Online Greetings Across Complete Lycos Net Sites"; Waltham, Mass. And Cleveland, Ohio.*

Anon., "MAXIS: "Simcity" Company Releases New Gift Making software; Innovative Gift Maker lets users design and order presents using PCs"; Business Wire; Nov. 3, 1994.*

* cited by examiner

FIG. 10

| BASEBALL CAPS – STYLE 1 | | | | |
|---|---|---|---|---|
| VENDOR | MESSAGE LIMIT | TYPESTYLES | TEXT COLOR | ⋮ |
| A | 30 CHARACTERS | ARIAL<br>COURIER<br>TAHOMA<br>TIMES NEW ROMAN | BLUE (288)<br>GREEN (357)<br>BLACK (011)<br>RED (441)<br>YELLOW (404) | ⋮ |
| B | 25 CHARACTERS | COURIER<br>TAHOMA<br>TIMES NEW ROMAN<br>VERDANA | BLUE (288)<br>BLUE-GREEN (326)<br>GREEN (355)<br>BLACK (011)<br>GRAY (094)<br>RED (447)<br>PINK (493)<br>YELLOW (404) | ⋮ |
| ⋯ | ⋯ | ⋯ | ⋯ | ⋮ |

1010 — BASEBALL CAPS – STYLE 1
1020 — BASEBALL CAPS – STYLE 2
1030 — BASEBALL CAPS – STYLE 3

INTELLIGENT PERSONALIZATION SYSTEM AND METHOD

RELATED APPLICATIONS

The present application is related to and hereby incorporates by reference, in their entirety, the following commonly owned U.S. patent applications, both of which were filed on the same day as the present application: U.S. patent application Ser. No. 09/550,104, filed Apr. 14, 2000, entitled "Online Artisan Community System and Method," now abandoned, and U.S. patent application Ser. No. 09/555,010, filed Apr. 14, 2000, now U.S. Pat. No. 7,016,865, entitled "Personalization Format Converter System and Method."

FIELD OF THE INVENTION

The present invention relates to the field of product design. More specifically, the invention relates to a computer-based system for facilitating the creation of products having features personalized by a customer.

BACKGROUND OF THE INVENTION

Product customization is popular within many retail markets. Customers may add personalized features to a wide variety of products, such as greeting cards, T-shirts, hats, and golf balls. The personalization itself may take many forms, such as the product size, shape and color, and the location, size, shape and color of added text and graphics.

The personalization options presented to the customer are often quite limited. For example, a customer designing a personalized greeting card may be required to make a series of discrete text selections, each text selection coming from a limited number of prewritten choices. Or, if the customer is allowed to create his or her own text, it may be limited to a preset number of characters. Such limitations necessarily constrain the ability of customers to fully express themselves via the resulting personalized products.

Computer hardware and software developed for home use now provides a new source of text and graphics that may be incorporated into a personalized product. Customers may use applications such as Adobe Illustrator™, Paint Shop Pro™, and Corel Photo-Paint™ to create digital images for this purpose. The images created with these applications, however, often possess greater spatial resolution and include a larger number of colors than may be handled by the manufacturer of the personalized product. Furthermore, the size, shape, or format of the digital image may fail to correspond with the needs of the manufacturer. For a particular digital image, these limitations may preclude the creation of a personalized product utilizing that digital image, or at least result in a product that is unsatisfactory to the customer.

Similarly, word processors such as Microsoft Word™ and Corel WordPerfect™ provide customers with hundreds or even thousands of different typestyles for text. Many of these fonts, however, may be incompatible with the needs of the manufacturers of the personalized product.

Furthermore, customers may want to incorporate images and text into personalized products in myriad different ways. For example, some customers may want to add features to the brim of a baseball cap, rather than merely to the traditional location at front and center on the crown of the hat. Some such variations may be impossible for manufacturers of the personalized product to produce. At present, such customers may exert great time and effort up front to generate designs that are known by the manufacturers to be impractical.

Personalization systems developed for a user at a home computer requires the user to load specialized software onto his or her home computer. As such, the user must have a computer with an operating system compatible with the specialized software, and he or she must go to the trouble of acquiring the specialized software in the first place.

The present invention seeks to overcome these and other problems.

SUMMARY OF THE INVENTION

The present invention provides methods and systems for facilitating the design of a personalized product. In one embodiment, the method is used in a system where a user on a user computer can access at least one host merchant computer via a communication network, the host merchant computer including a web server in communication with a products database containing information on products available for personalization and further containing manufacturing capabilities for the products. The method includes providing to the user via the communication network at least one web page providing an assortment of product selections available in the products database, receiving a message from the user via the communication network indicating a selection of a product from the assortment, retrieving a set of manufacturing capabilities for the selected product from the products database, providing to the user via the communication network a design interface, the design interface comprising at least one web page including at least one design tool that allows the user to select product configuration options and to create individualized enhancements, and wherein the design tool is conformed to only allow configuration options and enhancements which satisfy the manufacturing capabilities, and receiving from the user via the design interface a set of product configuration options and a set of individualized enhancements for the selected product.

In another embodiment, the method is used with a system where a user on a user computer can access at least one host merchant computer via a communication network, the method including providing an assortment of product selections to the user via the communication network, receiving a message from the user via the communication network indicating a selection of a product from the assortment, retrieving a set of manufacturing capabilities for the selected product, and providing to the user via the communication network a design interface, the design interface comprising at least one design tool that allows the user to select product configuration options and to create individualized enhancements, and wherein the design tool is adapted so that the user may only select configuration options and create enhancements which comply with the manufacturing capabilities.

In another embodiment, the method includes receiving from the user via a communication network a first set of design components created for a first product, the first set of design components corresponding to product configuration options and individualized enhancements, receiving from a user via the communication network an identifier for a second product selected for personalization, retrieving a set of manufacturing capabilities for the second product, generating a second set of design components derived from the first set of design components, wherein each component of the second set of design components complies with the set of manufacturing capabilities, and providing to the user a design interface comprising at least one design tool enabling the user to modify the design components, wherein the design interface is adapted so that the user may only create design components which comply with the set of manufacturing capabilities, and receiving from the user via the design interface a set of product configuration options and a set of individualized enhancements for the selected product.

In another embodiment, the method is used with a system where a user on a user computer can access at least one host merchant computer via a communication network, the method including providing to the user via the communication network a design interface, the design interface comprising at least one design tool that allows the user to select product configuration options and to create individualized enhancements, the configuration options and individualized enhancements comprising design components, receiving a first set of design components corresponding to a first set of individualized enhancements from the user via the design interface before a product to be personalized has been identified, receiving an identifier for a product selected for personalization from the user via the communication network, retrieving a set of manufacturing capabilities for the selected product, generating a second set of design components derived from the first set of design components, wherein each component of the second set of design components complies with the set of manufacturing capabilities, loading the second set of design components into the design interface, and adapting the design interface so that the user may only select product configuration options and create individualized enhancements satisfying the set of manufacturing capabilities.

In another embodiment, the method is used with a system where a user on a user computer can access at least one host merchant computer via a communication network, the host merchant computer including a web server in communication with a products database containing information on products available for personalization and further containing manufacturing capabilities for the products, the method including receiving from the host merchant via the communication network at least one web page providing an assortment of product selections available for personalization, selecting a product from the assortment using a web-based selection tool, receiving from the host merchant via the communication network a design interface, the design interface comprising at least one web page including at least one design tool that allows the user to select product configuration options and to create individualized enhancements, and wherein the design tool is conformed to only allow configuration options and enhancements which satisfy the manufacturing capabilities, and creating at least one individualized enhancement for the selected product using the design interface.

Another embodiment is a system to allow a user to design personalized products, the system accessible to a user on a user computer via a communication network, the system including a server in communication with the communication network; a products database in communication with the server, the products database comprising information on an assortment of product selections available for personalization, and further comprising manufacturing capabilities for the product selections, a personalized product module in communication with the products database, the personalized product module capable of presenting an assortment of product selections to the user, and the personalized product module further capable of receiving an identifier of a selected product from the user, a set of design tools in communication with the personalized product module that allow the user to select product configuration options and create individualized enhancements, wherein the set of design tools is adaptable to only accept product configuration selections and individualized enhancements which comply with a set of manufacturing capabilities associated with the selected product, and a design buffer in communication with the personalization palette, the design buffer capable of containing product configuration options and individualized enhancements generated by the user via the personalization palette during a current design session.

Another embodiment is a system to allow a user to design personalized products, the system accessible to a user on a user computer via a communication network, the system including a products database comprising information on an assortment of product selections available for personalization, and further comprising manufacturing capabilities for the product selections, a first module in communication with the products database, the first module capable of receiving an identifier of a selected product from a user, and a second module in communication with the first module, the second module comprising at least one design tool that allow the user to select product configuration options and create individualized enhancements, wherein the design tool is adaptable to only accept product configuration selections and individualized enhancements which comply with a set of manufacturing capabilities associated with the selected product.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE FIGURES

These and other features and advantages of the invention will now be described with reference to the drawings of certain preferred embodiments, which are intended to illustrate and not to limit the invention, and in which:

FIG. 10 is a sample set of data records containing manufacturing capabilities for different styles of baseball caps.

FIG. 14A depicts a method of a host merchant; FIG. 14B depicts a method of a customer.

DETAILED DESCRIPTION OF THE PREFERRED EMBODIMENTS

A. Overview of Web Site and Personalization Palette

Figure 1:
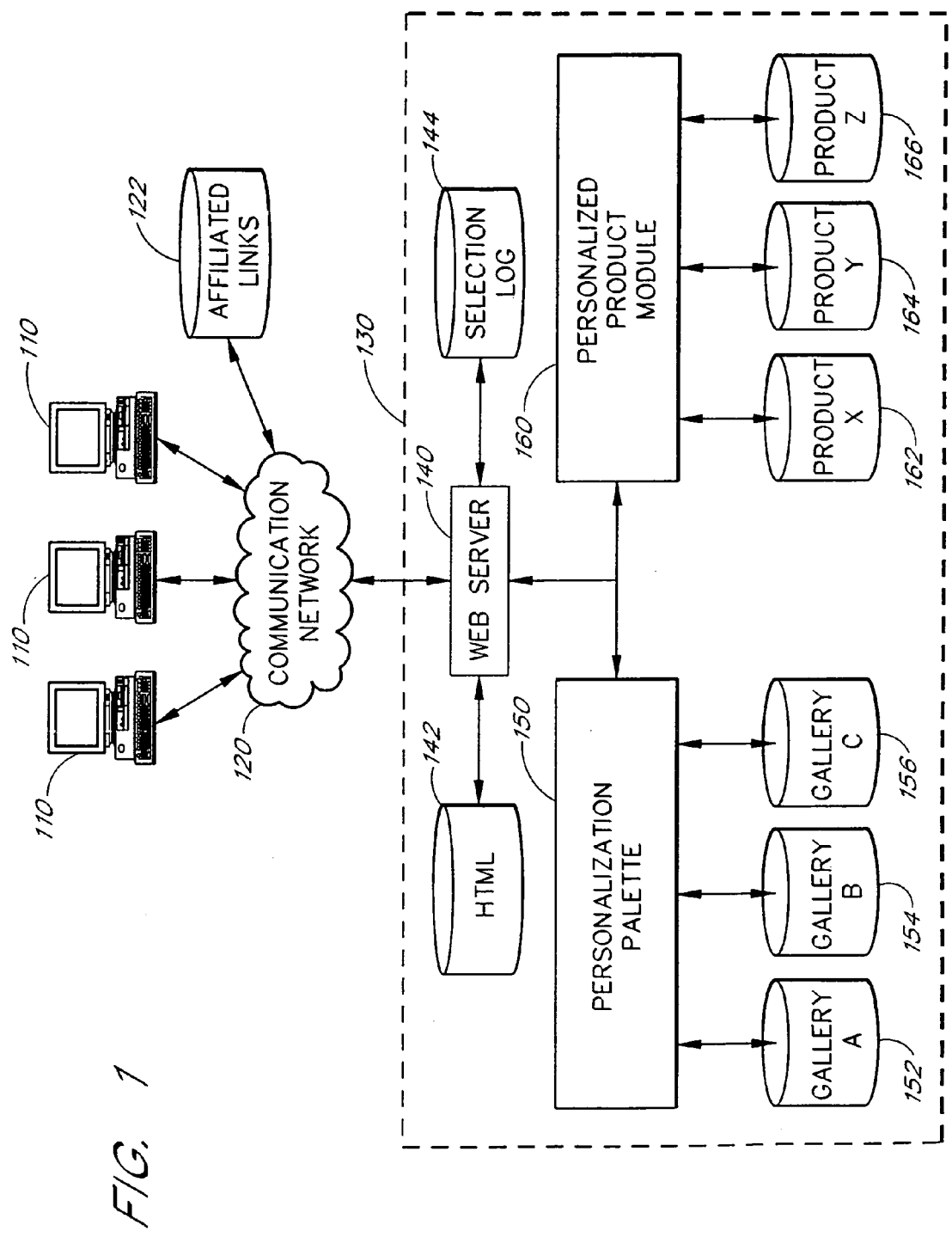
FIG. 1 is a block diagram of aspects of one embodiment of the present invention.

FIG. 1 illustrates a web site 130, including components used to implement a Personalization Palette in accordance with the present invention. As is well known in the art of electronic commerce, the web site 130 includes functionality for allowing customers on user computers 110 to navigate within the site via a communication network 120, such as the Internet. The following description will reference some aspects of the invention in the context of a host merchant ("Plaid Moon") web site. These details are set forth in order to illustrate, and not to limit, the invention.

As used herein, the terms "communication network" and "Internet" refer to a network or combination of networks spanning any geographical area, such as a local area network, wide area network, regional network, national network, and/or global network. Those terms may refer to hardwire networks, wireless networks, or a combination of hardwire and wireless networks. Hardwire networks may include, for example, fiber optic lines, cable lines, ISDN lines, copper lines, etc. Wireless networks may include, for example, cellular systems, personal communication services (PCS) systems, satellite communication systems, packet radio systems, and mobile broadband systems. A cellular system may use, for example, code division multiple access (CDMA), time division multiple access (TDMA), personal digital phone (PDC), Global System Mobile (GSM), or frequency division multiple access (FDMA), among others.

As used herein, the term "website" refers to one or more interrelated web page files and other files and programs on one or more web servers, the files and programs being accessible over a computer network, such as the Internet, by sending a hypertext transfer protocol (HTTP) request specifying a uniform resource locator (URL) that identifies the location of one of said web page files, wherein the files and programs are owned, managed or authorized by a single business entity. Such files and programs can include, for example, hypertext markup language (HTML) files, common gateway interface (CGI) files, and Java applications. The web page files preferably include a home page file that corresponds to a home page of the website. The home page can serve as a gateway or access point to the remaining files and programs contained within the website. In one embodiment, all of the files and programs are located under, and accessible within, the same network domain as the home page file. Alternatively, the files and programs can be located and accessible through several different network domains.

In one embodiment, the website of the present invention includes a set of web pages, such as the above-mentioned home page. As used herein, a "web page" comprises that which is presented by a standard web browser in response to an http request specifying the URL by which the web page file is identified. A web page can include, for example, text, images, sound, video, and animation.

As used herein, a "customer" refers to a person that contributes in any way to the design of a personalized product as discussed herein. This term is meant to include both lay persons and professional designers. The term is further meant to collectively include all persons involved in any collaborative design efforts. The terms "customer," "visitor," and "user" are used interchangeably herein.

The web site 130 depicted in FIG. 1 is designed to accommodate visitors wanting to design and purchase personalized versions of products, such as T-shirts, mugs, business cards, and the like. As will be discussed in more detail below, the web site 130 provides visitors with the ability to browse and search over a wide variety of products for the purpose of selecting one or more products to personalize and purchase. The web site 130 further provides visitors with the ability to browse and search over a wide variety of digital images and text for incorporation within the product selected for personalization. The web site 130 further provides visitors with an interface that allows a visitor to personalize a wide variety of design components (e.g., the typestyle, color, and location of added text) for the product selected. As used herein, the term "design component" refers to a quantum of design information. Thus, a text string, the font size of the text, the color of the text, the font type of the text, the position of the text, the orientation of the text, the style of the text, image treatments on the text, and the like, are all separate design components. A set of design components collectively comprise a "product design."

Product designs include two distinct types of design information: "design configuration selections," and "individualized enhancements." Design configuration selections refer to features of the product being personalized that may be selected by a customer. Typically, the customer must choose one or more features from a predetermined list of options. For example, a customer personalizing a T-shirt may have to select the size of the T-shirt from a few options (e.g., small, medium, and large). Other common production configuration options include quantity and base color (e.g., a request for a dozen beige T-shirts and a dozen magenta T-shirts).

Individualized enhancements refer to those design details that augment the design configuration selections. These include the incorporation of graphics, photos, logos, text messages, monograms, and the like. Unlike product configuration options, which relate directly to the nature of the product itself, enhancements relate to supplemental design information that is generally separable from the product itself. Furthermore, enhancements require the contribution of information beyond simply making a selection from alternatives. Consider, for example, an alarm clock in which the alarm sound may be varied. If the alarm sound is selectable from preset choices (e.g., chiming bell, singing bird, etc.), the various alarm sounds correspond to product configuration options. If the customer may incorporate his or her own alarm sound (e.g., a recording of the customer's own voice) into the clock, the alarm sound corresponds to an enhancement.

As noted above, individualized enhancement require more than merely selecting an option from a limited number of alternatives. However, selections may be used to provide some (but not all) aspects of an enhancement. For example, a customer may compose a poem for incorporation into a personalized product—clearly an individualized enhancement. The process of incorporating the message into the product design may include selecting options (e.g. font type, font size, etc.) from available alternatives. These options do not, of course, transform the poem into a product configuration option.

As shown in FIG. 1, the web site 130 includes a Web Server application 140, a Personalization Palette 150, and a Personalized Product Module 160. The Web Server 140, Personalization Palette 150, and Personalized Product Module 160 are comprised of one or more computers as defined herein. A computer, including the user computers 110, and the computers comprising the Web Server 140, Personalization Palette 150, and Personalized Product Module 160, may be any microprocessor or processor controlled device that permits access to the Internet 120, including terminal devices, such as personal computers, workstations, servers, clients, mini computers, main-frame computers, laptop computers, a network of individual computers, mobile computers, palm-top computers, hand-held computers, set top boxes for a TV, interactive televisions, interactive kiosks, personal digital assistants, interactive wireless communications devices, mobile browsers, or a combination thereof. The computers may further possess input devices such as a keyboard, mouse, touchpad, joystick, pen-input-pad, and output devices such as a computer screen and a speaker.

These computers may be uni-processor or multi-processor machines. Additionally, these computers include an addressable storage medium or computer accessible medium, such as random access memory (RAM), an electronically erasable programmable read-only memory (EEPROM), programmable read-only memory (PROM), erasable programmable read-only memory (EPROM), hard disks, floppy disks, laser disk players, digital video devices, compact disks, video tapes, audio tapes, magnetic recording tracks, electronic networks, and other techniques to transmit or store electronic content such as, by way of example, programs and data. In one embodiment, the computers are equipped with a network communication device such a network interface card, a modem, or other network connection device suitable for connecting to the communication network 120. Furthermore, the computers execute an appropriate operating system such as Linux, Unix, Microsoft® Windows® 95, Microsoft® Windows® 98, Microsoft®. Windows® NT, Apple® MacOS®, or IBM® OS/2®. As is conventional, the appropriate operating system includes a communications protocol implementation which handles all incoming and outgoing message traffic passed over the Internet 120. In other embodiments, while the operating system may differ depending on the type of computer, the operating system will continue to provide the appropriate communications protocols necessary to establish communication links with the Internet 120.

The computers may advantageously contain program logic, or other substrate configuration representing data and instructions, which cause the computer to operate in a specific and predefined manner as described herein. In one embodiment, the program logic may advantageously be implemented as one or more object frameworks. These modules may advantageously be configured to reside on the addressable storage medium and configured to execute on one or more processors. The modules include, but are not limited to, software or hardware components which perform certain tasks. Thus, a module may include, by way of example, components, such as, software components, object-oriented software components, class components and task components, processes, functions, attributes, procedures, subroutines, segments of program code, drivers, firmware, microcode, circuitry, data, databases, data structures, tables, arrays, and variables.

Computers associated with the web site 130 may be generally referred to as "host merchant computers." Computers associated with a customer visiting the web site 130 may be referred to as "user computers" or "customer computers."

The Web Server 140 processes customer requests received from user computers 110 via the Internet 120. These requests include selections submitted by customers during the creation of a personalized product design. The web server 140 records these selection requests within a selections log 144. The information stored within the selections log 144 may be used to create a historical database for each customer who utilizes the web site 130. The information within this historical database may be used to enhance subsequent visits by the same customer. For example, the mailing address information received from a particular customer during one visit may be retained so that he or she need not reenter the information during later visits. A particular customer is preferably identified via his or her electronic mail address, via an assigned identification code, or via some combination of two. In one embodiment, customers must register with an identification code and password during their initial visit to the web site 130. Customers then submit this identification code and password in a login web page during subsequent visits to gain access to the remainder of the web site 130.

The web site 130 also includes a database 142 of HTML content that includes, among other things, the format and content information used to generate web pages viewable by web browsers on the user computers 110.

The Personalization Palette 150 is one embodiment of a design interface module that provides a set of design tools for designing personalized products. The Personalization Palette 150 communicates with a number of image galleries containing images (including personal images and Plaid Moon images) that a visitor to the web site 130 may load into the Personalization Palette 150 for incorporation as individualized enhancements of a personalized product. In this application, the term "image" is used for ease of description and encompasses any design component storable in digital form that may be incorporated into a personalized product. This includes, but is not limited to, two- and three-dimensional representations, audio, video, animation, and the like. Images may be incorporated onto products in many different ways depending upon the nature of the image and the nature of the product. Two-dimensional pictorial images may be incorporated onto a paper product (e.g., a business card) using ink, onto a glass or metal product using, for example, etching, onto a wood product using ink, paint, carving, etc., onto a T-shirt using silk-screening, sewing, and so on. Audio enhancements may be incorporated onto alarm clocks (e.g., personalized wake-up messages), onto greeting cards (e.g., a birthday medley), on to cuckoo clocks, and so on. The manner of incorporation is limited only by the manufacturing capabilities of the vendors, which produce the personalized product.

The image galleries, shown generically in FIG. 1 as Gallery A 152, Gallery B 154, and Gallery C 156, store digital versions of images that may be incorporated into personalized products. The three galleries shown in FIG. 1 represent a much larger collection of galleries (discussed in more detail below) that are available to a visitor of the web site 130. Users of the Personalization Palette 150 may access these galleries via either a search mode or a browse mode. In either mode, abridged image depictions (e.g. thumbnail versions of images, snapshots from video, brief snippets from audio, etc.) and associated descriptions for a number of images are presented to the customer within a window (discussed below). The customer may select an image (e.g., via a mouse click on the desired image) to experience the complete image (e.g., receive full-size and -resolution images, full-length and -size video, full-length audio, etc.). Images may be stored in any number of formats, depending upon their content, including AIFF (Audio Interchange File Format), AU (Ulaw audio file), AVI (Video for Windows), Binhex (Macintosh file format), BMP (Bitmap), DWG (AutoCAD drawing file), DXF (Drawing eXchange Format), EPS (Encapsulated PostScript), GIF (color image format), HTML (HyperText Markup Language), JPEG (Joint Photographic Experts Group), MAX (Studio Max file format), MIDI (music format), MPEG (Moving Picture Experts Group), PSD (PhotoShop image), PICT (Macintosh image format), PS (PostScript), MOV (QuickTime movie), PDF (Portable Data Format), RTF (Rich Text Format), SWF (Shockwave Flash), TIFF (Tagged Image File Format), and WAV (Wave sound file).

A user of the Personalization Palette 150 may also access images stored on databases outside the web site 130, represented in FIG. 1 as Affiliated Links 122. These remote images may be accessed and viewed by the user via the Internet 120.

The personalized product module 160 allows a customer to browse and/or search for products that may be personalized and purchased on the web site 130. The personalized product module 150 communicates with a number of product databases that contain information regarding commercial products. In this application, the term "product" encompasses anything that may be personalized by a customer. This includes, but is not limited to, clothing, shoes, textiles, kitchenware, office supplies, school supplies, sports equipment, cards, paper goods, flower arrangements, and the like.

The product databases, shown in FIG. 1 as Product X 162, Product Y 164, and Product Z 166, store information about particular products. The three product databases shown in FIG. 1 generically represent a much larger collection of product databases (discussed in more detail below) associated with the available products of the web site 130. Customers of the web site 130 may access these product databases and browse descriptions of the products described within. Furthermore, the information within the product databases enhances the design process by influencing the Personalization Palette 150 used by the customer in creating the personalized product.

The depicted components in FIG. 1 and in later figures may advantageously communicate with each other and other components comprising the respective computers through mechanisms such as, by way of example, interprocess communication, remote procedure call, distributed object interfaces, and other various program interfaces. Furthermore, the functionality provided for in the components, modules, and databases may be combined into fewer components, modules, or databases or further separated into additional components, modules, or databases. Additionally, the components, modules, and databases may advantageously be implemented to execute on one or more computers. In another embodiment, some of the components, modules, and databases may be implemented to execute on one or more computers external to the web site 130. In this instance, the web site 130 includes program logic, which enables the web site 130 to communicate with the externally implemented components, modules, and databases to perform the functions as disclosed herein.

There are several different ways in which a visitor to the web site 130 may utilize the Personalization Palette 150. First, the visitor may browse and/or search for a product of interest. After selecting a product, the visitor may then access the Personalization Palette 150 to personalize the selected product. Second, the visitor may utilize the Personalization Palette 150 without having first selected a product. After finishing a design, the visitor may then browse and/or search for one or more products within which to incorporate the design. Finally, the visitor may use the Personalization Palette 150 to use designs created (and saved) for one product for incorporation into another type of product. The design created for a personalized business card, for example, may be saved and later used to create a personalized T-shirt.

B. The Personalization Palette Page

Figure 2:
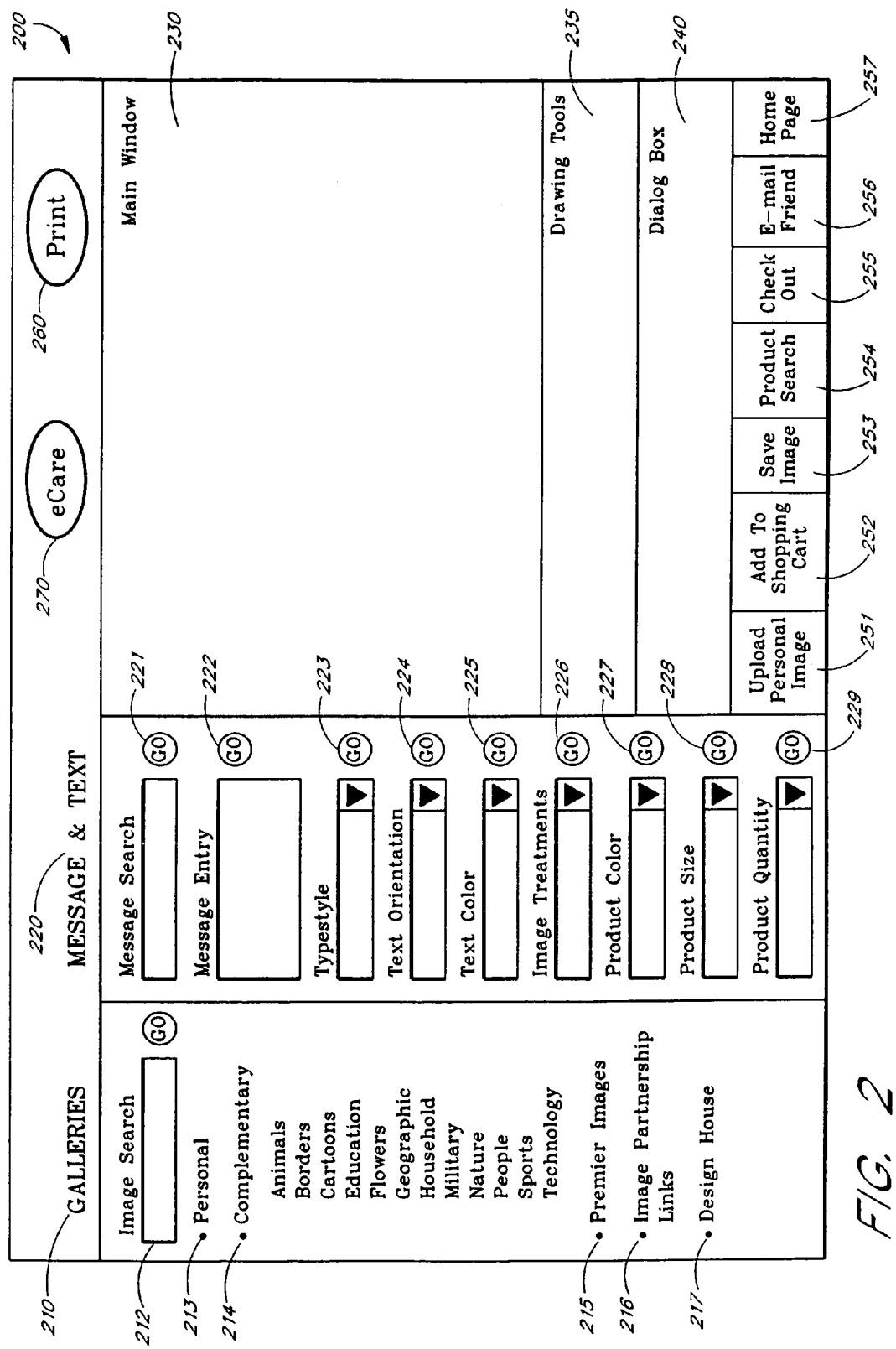
FIG. 2 illustrates a sample web page providing an interface for customers to design personalized products.

A customer is presented with a design interface comprising one or more design tools enabling the customer to create a set of design components. FIG. 2 illustrates an example of such a design interface, in the form of a Personalization Palette Page 200 of the host merchant web site 130. Customers visiting the Personalization Palette Page 200 are provided access to a number of design tools, such as image and text galleries, image and text search tools, and tools for positioning and sizing images, for drawing, for selecting text typestyle, color, orientation, etc. The full grouping of design tools presented to the user may be referred to as the "set of design tools."

Many visitors to the web site 130 may want to incorporate individualized enhancements in the form of pictorial images into their personalized products. Customers have access to a number of galleries 210 presented within the Personalization Palette Page 200 containing, among other things, pictorial images. In one embodiment, the galleries are presented as a list of hypertext links, as shown in FIG. 2. Alternatively, the galleries are accessible via other well-known web-based display techniques such as popup or pulldown menus. The list of galleries in FIG. 2 includes a Personal Gallery 213, a list of Complementary Galleries 214, a Premier Images Gallery 215, Image Partnership Links 216, and a "Design House" 217. The images within these galleries are intended for incorporation within the personalized product designs created by users of the Personalization Palette 150.

The Personal gallery 213 shown in FIG. 2 is a link to a web page comprising a private gallery accessible only to the specific customer (as identified at login) viewing the Personalization Palette Page 200. Each customer has his or her own storage within the web site 130, accessible through the Personal Gallery link 213, containing pointers to those images and designs stored previously by that customer. This allows a customer to reuse images and personalized designs created during earlier visits to the web site 130. A customer may upload images from his or her home computer 110, for example, images created with applications on the customer's computer 110, such as Adobe Illustrator™, Paint Shop Pro™ and Corel Photo-Paint™ to the Personal Gallery 213.

The Complementary galleries 214 shown in FIG. 2 include images stored within a number of categories. In one embodiment, the Complementary Galleries 214 is presented as a hypertext directory tree. In this embodiment, selecting the Sports Gallery generates a listing of sports-related galleries (e.g., Baseball Gallery, Basketball Gallery, Football Gallery, Golf Gallery, Tennis Gallery, etc.) within the Main Window 230. The further selection of the Baseball Gallery may generate a display within the Main Window 230 of abridged depictions of images associated with baseball. Alternatively, the Baseball Gallery may be subdivided further into categories such as Major League Baseball Gallery, American League Gallery, National League Gallery, Little League Gallery, Team Logo Gallery, etc.

Separate galleries may also be used for pictorial images, three-dimensional representations, audio files, video files, and so on.

The Premier Images gallery 215 shown in FIG. 2 includes images that result in greater-than-normal cost when incorporated into a personalized product. These include images of unusual size, shape, resolution, color content, and the like, and specialty images such as three-dimensional renderings and holographic images.

The Image Partnership Links 216 shown in FIG. 2 provides the customer with access to the image databases located remotely from the web site 130, shown in FIG. 1 as Affiliated Links 122.

The Design House 217 selection shown in FIG. 2 is not a gallery, but instead provides access to another web page within the web site 130 wherein the customer may search for and interact with artists for the purpose of commissioning artwork for incorporation into a personalized product. This feature of the web site 130 is discussed in detail in the related application, "Online Artisan Community," filed concurrently with the present application and identified above.

The Complementary galleries 214 list described above provides the customer with the ability to browse images on the basis of subject matter. The images within the web site 130 may be categorized in several different ways. The Complementary galleries 214 list displayed in FIG. 2 shows a categorization based on the subject matter of the image. Images may also be categorized by the nature of the image itself (graphic arts, digitized photograph, three-dimensional rendering, audio stream, etc.), on the style of the image (logos, cartoons, watercolors, etc.), and on the source of the image (artist 1, artist 2, artist 3, etc.). In one embodiment, the web site 130 also includes categories for different "Affinity Shops," referring to image databases created by particular organizations that register with the web site 130. For example, the American Association of Retired Persons (AARP) could create an "AARP Gallery" containing AARP logos and other images created by the organization. The images within the AARP Gallery would then be available for the creation of personalized products (e.g., promotional materials) by members and others.

Each digital image within the web site 130 is associated with an ancillary textual description that characterizes the content of the image. In one embodiment, the description is a list of keywords. In another embodiment, the description is written in prose. The description includes the title (if appropriate), the number of spot colors, the image size and resolution, the theme (e.g., "wedding scene"), a brief description of the distinguishing content (e.g., "young girl in red dress carrying flowers"), the original artist who created the image, the date upon which the image was created, the date of the last modification, the gallery in which it is found, and the price.

Figure 3:
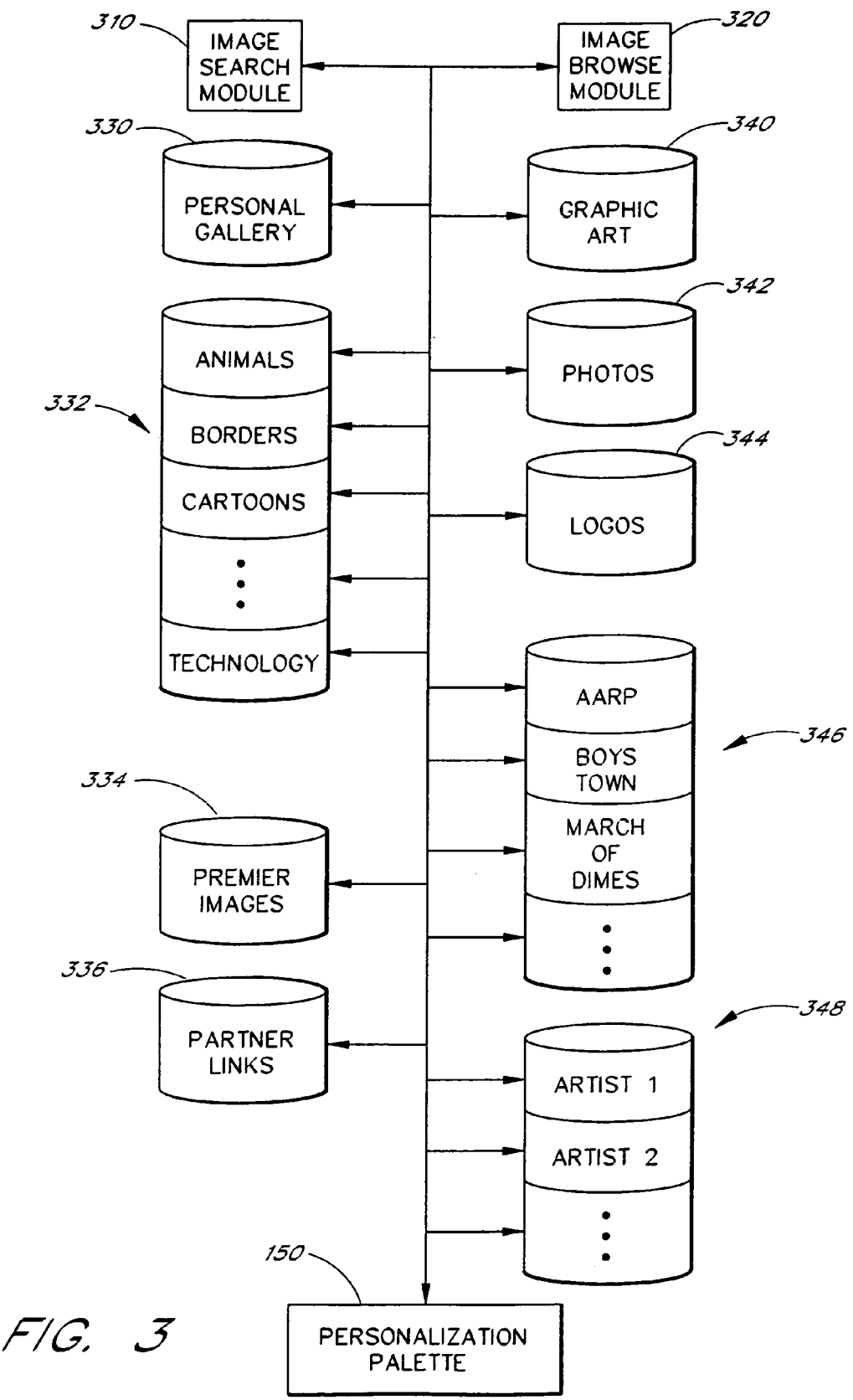
FIG. 3 is a block diagram of a system that allows a customer to search and browse image galleries.

FIG. 3 illustrates one embodiment of a database structure in communication with the Personalization Palette 150 that allows a customer to browse the various image galleries of the web site 130. As shown in FIG. 3, images are contained in a Personal Gallery database 330, in multiple databases 332 associated with the Complementary galleries, in a Premier Images database 334, and in a Partner Links 336 database. In this embodiment, these databases correspond to the like-named image galleries depicted in FIG. 2. Each customer who registers with the web site 130 has his or her own Personal Gallery database 330, structured so as only to be accessible to that customer (as identified at login). The Partner Links 336 database contains links to the remote databases depicted in FIG. 1 as Affiliated Links 122. Images are also contained in a Graphic Art database 340 (containing graphic art images), in a Photos database 342 (containing photographs taken with digital cameras and digitized versions of film-based photographs), in a Logos 344 database (containing company logos), in multiple databases 346 associated with Affiliate Shops, and in multiple databases 348 associated with particular artists. An individual image satisfying multiple categories (e.g. a logo containing a depiction of an animal) may be reproduced in multiple databases or, alternatively, may be cross-indexed so as to indicate a connection to multiple pertinent databases. Images are preferably stored as data files created through well-known lossless image compression techniques.

As shown in FIG. 3, an Image Browse Module 320 is in communication with each of the image databases. In one embodiment, the Image Browse Module 320 is incorporated within the Personalization Palette 150. In another embodiment, the Image Browse Module 320 is in communication with the Personalization Palette 150. The Image Browse Module 320 receives customer selections of image galleries within the Personalization Palette Page 200 and displays the appropriate result in the Main Window 230. The appropriate result is generally either a list of sub-galleries within the selected gallery or a display of abridged versions of images. Abridged images may be created and displayed using well-known software, such as Iterated Systems Imageware$^{SM}$. If all of the abridged images within the selected gallery or sub-gallery cannot be displayed within the Main Window simultaneously, well-known web-based techniques, such as slide bars, may be used to allow the customer to browse all of the abridged images.

In one embodiment, each abridged image on display is accompanied by the ancillary textual description of the image. In another embodiment, the descriptions are only displayed if selected by the customer. In the latter embodiment, the descriptions may optionally be displayed within the Main Window 230, within a popup window, or within a Dialog Box 240 shown below the Main Window 230.

As shown in FIG. 2, the Personalization Palette Page 200 in one embodiment further includes an Image Search interface 212 that allows a customer to search for an image within the various image galleries having some quality of interest. The Image Search interface 212 includes a query field within which a customer may enter a search query, and a search initiation button, depicted as a "GO" button in FIG. 2, that initiates a search based upon the entered search query.

The search for the most relevant images associated with the search query is conducted by an Image Search Module 310, shown in FIG. 3 in communication with the various image galleries. In one embodiment, the Image Search Module 310 is incorporated within the Personalization Palette 150. In another embodiment, the Image Search Module 310 is in communication with the Personalization Palette 150. The Image Search Module 310 receives customer search queries from the Image Search tool 212 within the Personalization Palette Page 200 and displays the appropriate search results in the Main Window 230. The Image Search tool 212 is preferably replicated on each web page within the image galleries directory tree.

The Image Search Module 310 identifies and prioritizes images that are relevant to the search by comparing the submitted search query to the ancillary description associated with each image. This comparison may be done using well-known search techniques. In one embodiment, the "term frequency inverse document frequency" (TFIDF) approach is used. To use this approach, a database is created containing an indexed list of every word that appears in any ancillary image description. The database links each word with an identifier for every image description that includes that word. This indexed database (not shown in FIG. 3) is then searched for each term within the search query. The Image Search Module 310 applies a weighting to each word of a multiple-term query that is inversely related to the word's frequency of appearance in the indexed database. In other words, the term in a query that appears least often throughout the image descriptions is considered to be the most discriminating term in the query, and thus is given the greatest weight by the Image Search Module 310. For example, the Image Search Module 310 will prioritize the results from the search query, "Dalmatian dog" such that image descriptions containing the unusual word (Dalmatian) are ranked higher than image descriptions containing only the common word (dog). Algorithms for implementing this approach are well known and are commonly available in software development kits associated with commercial search engines such AltaVista® and Excite$^{SM}$.

In one embodiment, the Image Search Module 310 will search all of the image galleries associated with the web site 130. In another embodiment, the customer has the option of specifying one or more image galleries (e.g., the cartoon gallery 162) for searching.

The Personalization Palette 150 includes a design tool that allows customers to set the size, location, and orientation of an image within the allowed spaces of the personalized design. As such, the Personalization Palette Page 200 provides customers with an interface that allows customers to provide size, location, and orientation information. In one embodiment, the interface includes a dropdown menu from which the customer may select one of several options. As is discussed below, the image sizes, positions, and orientations available to the customer within this interface is constrained by the nature of the product being personalized. For example, T-shirt vendors may limit images to the to the front, back, sleeve, pocket, etc. Some vendors may allow the incorporation of images oriented vertically, at 45-degree angles, and so on.

In one embodiment, this interface acts in cooperation with a cursor-based input device, such as a mouse. In this embodiment, the customer selects a general location (e.g., at the top-left corner of the front of a T-shirt). A depiction of the product with the image in the selected location then appears in the Main Window 230. The customer may then use the mouse to click-and-drag the image within the depiction of the product to the precise position desired.

In addition to the use of pictorial images, many visitors to the web site 130 may want to incorporate individualized enhancements in the form of text messages into their personalized products. To facilitate this aspect of the design, customers have access to a number of prewritten messages within the Personalization Palette Page 200. In one embodiment, the prewritten messages are categorized by subject matter, theme, etc. and presented as a list of hypertext links analogous to those shown for images in FIG. 2. In other embodiments, the prewritten messages are accessible via other well-known means such as popup or pulldown menus.

As with the digital images, the prewritten messages within the web site 130 may be categorized in several different ways. Messages may be categorized based on the subject matter of the message (e.g., sports, animals, etc.), the nature of the text itself (poetry, prose, iambic pentameter, etc.), the age of the intended audience (child, teenager, adult, etc.), the gender of the intended audience, and on the composer of the message (poet 1, poet 2, poet 3, etc.). Message categories similar to the Complementary digital image galleries of FIG. 2 include Birthday, Expressive, Congratulatory, Holiday, Household, Humorous, Puns, Quotes, Religious, Riddles, Sappy, School, Slogans, Vacation, and Workplace.

In one embodiment, an Affinity Shops organization may store prewritten messages within a category created for that organization. For example, the Boy Scouts of America may store the Boy Scouts oath for use by scouts and their supporters.

Figure 4:
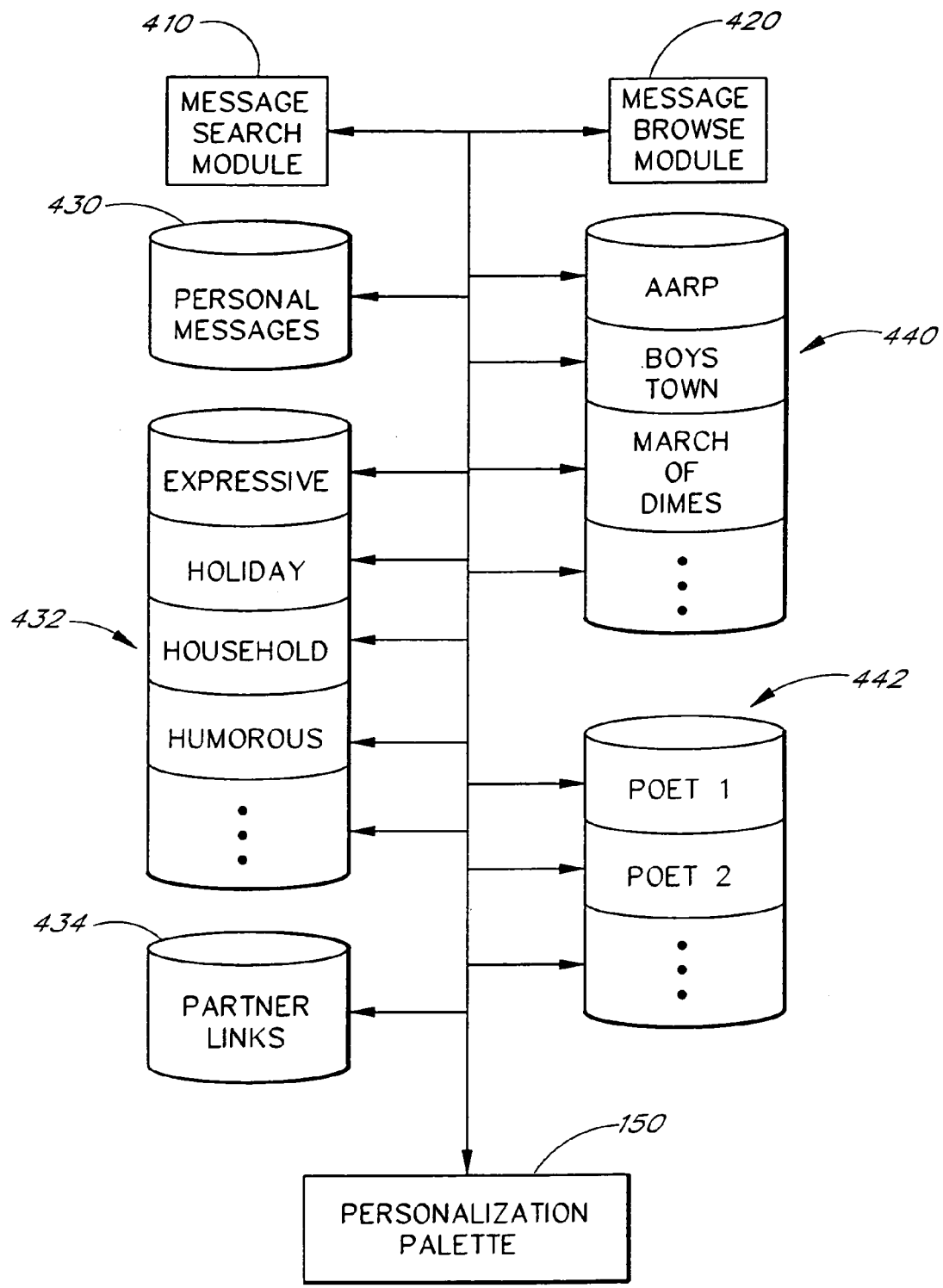
FIG. 4 is a block diagram of a system that allows a customer to search and browse prewritten text messages.

FIG. 4 illustrates one embodiment of a database structure in communication with the Personalization Palette 150 that allows a customer to browse the various prewritten messages of the web site 130. As shown in FIG. 4, text messages are contained in a Personal Messages database 430, in multiple databases 432 associated with subject-based categories, and in a Partner Links 434 database. Text messages are also contained in multiple databases 440 associated with Affiliate Shops, and in multiple databases 442 associated with particular writers/poets. Each customer who registers with the web site 130 has his or her own Personal Messages database 430, that, like the Personal Gallery database 330, is accessible only to that customer. The Personal Messages database 430 includes those messages previously stored by the customer for use in later designs. The Partner Links 434 database contains links to text message databases located remotely from the web site 130, shown in FIG. 1 as Affiliated Links 122. An individual text message satisfying multiple categories (e.g., a poem about an animal) may be reproduced in multiple databases or, alternatively, may be cross-indexed so as to indicate a connection to multiple pertinent databases.

As shown in FIG. 4, a Message Browse Module 420 is in communication with all of the message databases. In one embodiment, the Message Browse Module 420 is incorporated within the Personalization Palette 150. In another embodiment, the Message Browse Module 420 is in communication with the Personalization Palette 150. The Message Browse Module 420 receives customer selections of text messages within the Personalization Palette Page 200 and displays the appropriate result in the Main Window 230. The appropriate result is generally either a list of subdivided message category options within the selected category or a display of the messages themselves.

As shown in FIG. 2, the Personalization Palette Page 200 in one embodiment further includes an Message Search interface 221 that allows a customer to search for a message within the various message categories having some quality of interest. The Message Search interface 221 includes a query field within which a customer may enter a search query, and a search initiation button, depicted as a "GO" button in FIG. 2, that initiates a search based upon the entered search query.

The search for the most relevant messages associated with the search query is conducted by a Message Search Module 410, shown in FIG. 3 in communication with the various image galleries. In one embodiment, the Message Search Module 410 is incorporated within the Personalization Palette 150. In another embodiment, the Message Search Module 410 is in communication with the Personalization Palette 150. The Message Search Module 410 receives customer search queries from the Message Search tool 221 within the Personalization Palette Page 200 and displays the appropriate search results in the Main Window 230.

The Message Search Module 410 identifies and prioritizes messages that are relevant to the search by comparing the submitted search query to the text of each message. This comparison may be done using well-known search techniques, as discussed above.

In one embodiment, the Message Search Tool 410 will search all of the message categories associated with the web site 130. In another embodiment, the customer has the option of specifying one or more message categories for searching.

The Personalization Palette Page 200 also provides customers with a Message Entry interface 222 that allows customers to compose their own text messages. In one embodiment, as shown in FIG. 2, the Message Entry interface 222 includes a field within which the customer may enter text. The length of the text string that may be entered into this field is constrained by the Message Entry interface 222 or the available space in the window, based on the location of the text and the typestyle. Furthermore, as is discussed later, the constraint is also based upon the manufacturing capabilities of the relevant vendors for the product being personalized. For example, pencil vendors may require, for manufacturing and aesthetic reasons, a ten-point font with a message of no more than twenty-five characters.

Many products have multiple locations in which customers may incorporate text messages. For example, a T-shirt may include one message on the front of the shirt and a second message on the back. Similarly, the name, address, and company name on a business card are each separate text messages. In these situations, the customer must indicate the desired location of the text message (as discussed below) to be used for the message provided in the Message Entry interface 222.

The Personalization Palette Page 200 also provides customers with a Typestyle interface 223 that allows customers to select the typestyle for a text message incorporated into a personalized design. In this application, "typestyle" refers to a font (e.g., Times New Roman, Courier, Arial, etc.), a size (e.g., 10-point, 12-point, etc.), and a style (e.g., bold, italics, underlined, etc.). In one embodiment, as shown in FIG. 2, the Typestyle interface 223 includes a dropdown menu from which the customer may select one of several options. As is discussed later, the typestyles available to the customer within the Typestyle interface 223 is constrained by the nature of the product being personalized.

The Personalization Palette Page 200 also provides customers with a Text Orientation interface 224 that allows customers to select the location and orientation of the text incorporated into a personalized design. In one embodiment, as shown in FIG. 2, the Text Orientation interface 224 includes a dropdown menu from which the customer may select one of several options. As is discussed below, the text orientations available to the customer within the Typestyle interface 224 is constrained by the nature of the product being personalized. For example, T-shirt vendors may limit text messages to the front, back, sleeve, pocket, etc. Some vendors may allow the incorporation of text oriented vertically, at 45-degree angles, and so on.

In one embodiment, the Text Orientation interface 224 acts in cooperation with a cursor-based input device, such as a mouse. In this embodiment, the customer selects a general location (e.g., at the top-left corner of the front of a T-shirt). A depiction of the product with the text message in the selected location then appears in the Main Window 230. The customer may then use the mouse to click-and-drag the text message within the depiction of the product to the precise position desired.

The Personalization Palette Page 200 also provides customers with a Text Color interface 225 that allows customers to select the color of the text incorporated into a personalized design. In one embodiment, as shown in FIG. 2, the Text Color interface 225 includes a dropdown menu from which the customer may select one of several options. As is discussed below, the text colors available to the customer within the Typestyle interface 225 are constrained by the nature of the product being personalized. Some products, such as engraved jewelry, may lack the text color option.

The Personalization Palette Page 200 also provides customers with an Image Treatments interface 226 that allows customers to select special treatment (e.g., shadowing, flaming, etc.) for the text and images incorporated into a personalized design. In one embodiment, as shown in FIG. 2, the Image Treatments interface 226 includes a dropdown menu from which the customer may select one of several options. As is discussed below, the treatments available to the customer within the Image Treatments interface 226 may be constrained by the nature of the product being personalized.

If a design includes only a single text message, the text interfaces 222–225 are associated with that message. A customer may change an existing text message by making the modification with the various interfaces 222–225. If, however, there are multiple text messages within the product, the customer must select one of the messages to modify it. A customer may select a message, for example, by picking the appropriate message out of a list of messages on a dropdown menu, or by mouse-clicking on a depiction of the appropriate message superimposed on a depiction of the product. The attributes of the selected message then appear within the various message interfaces 222–225, where they may be modified by the customer.

The Personalization Palette Page 200 also provides customers the ability to select product configuration options. First, the Page 200 provides a Product Color interface 227 that allows customers to select the color for the product that is being personalized. In one embodiment, as shown in FIG. 2, the Product Color interface 227 includes a dropdown menu from which the customer may select one of several options. As is discussed below, the product colors available to the customer within the Product Color interface 227 may be constrained by the nature of the product being personalized. Golf balls, for example, are typically limited in color to white and particular shades of yellow, orange, and pink. Furthermore, background and foreground colors are configured to avoid conflicts (e.g., black writing on a black background).

The Personalization Palette Page 200 also provides customers with a Product Size interface 228 that allows customers to select the size of the product that is being personalized. In one embodiment, as shown in FIG. 2, the Product Size interface 228 includes a dropdown menu from which the customer may select one of several options. As is discussed below, the product sizes available to the customer within the Product Size interface 228 may be constrained by the nature of the product being personalized. T-shirts, for example, may be purchased from some vendors only in the sizes extra-large (XL), large (L), medium (M), small (S), and extra-small (XS).

The Personalization Palette Page 200 also provides customers with a Product Quantity interface 229 that allows customers to select the number of personalized products for purchase. In one embodiment, as shown in FIG. 2, the Product Quantity interface 229 includes a dropdown menu from which the customer may select one of several options. As is discussed below, the product quantity available to the customer within the Product Quantity interface 229 may be constrained by the nature of the product being personalized. Golf balls, for example, may be purchased from some vendors only in sets of twelve.

The Personalization Palette Page 200 preferably adjusts the product configuration features presented to the customer based on the features of the product being personalized. If the product of interest only comes in one color, the Product Color interface 227 need not be included. If, on the other hand, different parts of the product can be colored independently (e.g., the border and matting of a picture frame), the Personalization Palette Page 200 preferably provides the ability to independently color each part.

The Personalization Palette Page 200 also provides customers with a Drawing Tools interface 235 that allows customers to create and/or modify pictorial enhancements within the Main Window 230. The Drawing Tools interface 235 provides customers with well-known drawing tools common to such applications as Adobe Illustrator™, Paint Shop Pro™, and Corel Photo-Paint™. The Drawing Tools interface 235 includes tools for drawing lines, curves, rectangles, polygons, circles, ellipses, and rounded rectangles. The Drawing Tools interface 235 further includes tools for selecting different line types, weights, and colors, and for applying color via simulated "spray can" and "paint brush" applicators. As is discussed below, the specific drawing tools available to the customer within the Drawing Tools interface 235 may be constrained by the nature of the product being personalized.

The Personalization Palette Page 200 may also include an Audio Tool and/or a Video Tool (not shown in FIG. 2) providing customers with the ability to create sound and video enhancements.

Figure 5:
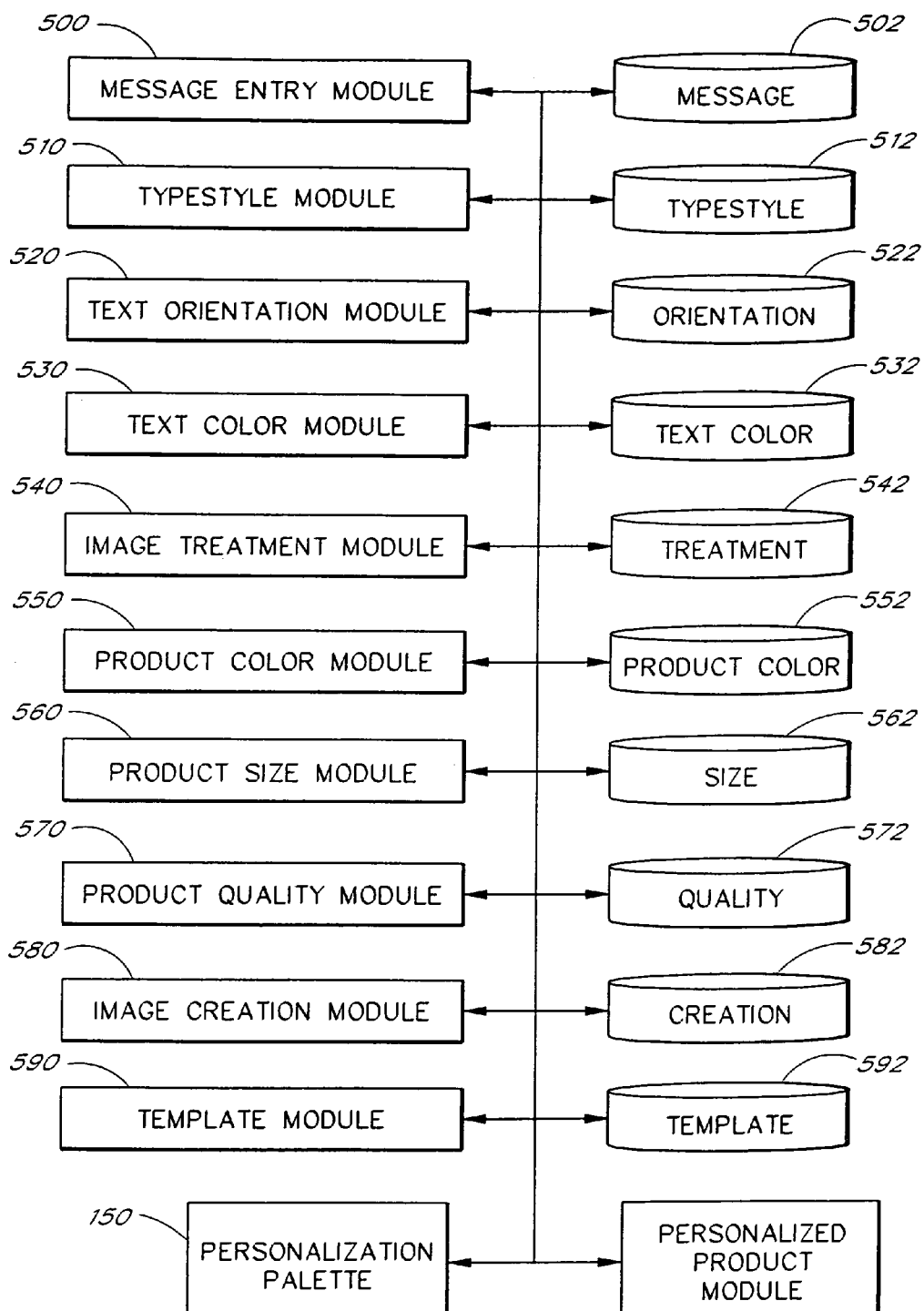
FIG. 5 is a block diagram of a system that allows a customer to create personalized designs on the web site.

FIG. 5 illustrates one embodiment of a module and database structure in communication with the Personalization Palette 150 and Personalized Product Module 160 that allows a customer to create personalized designs on the web site 130. The various modules depicted in FIG. 5 are either incorporated within or in communication with the Personalization Palette 150 and the Personalized Product Module 160.

As shown in FIG. 5, a Message Entry Module 500 communicates with a Message database 502. The Message Entry Module 500 receives a text message composed by the customer within the Message Entry interface 222 and stores the information within the Message database 502. As is discussed below, the Message database 502 also includes product-dependent constraint information that limits the length of the text message that may be entered by the customer via the Message Entry interface 222.

As shown in FIG. 5, a Typestyle Module 510 communicates with a Typestyle database 512. The Typestyle Module 510 receives a typestyle selection made by the customer via the Typestyle interface 223 and stores the information within the Typestyle database 512. As is discussed below, the Typestyle database 512 also includes product-dependent constraint information that limits the typestyle choices that may be selected by the customer via the Typestyle interface 223.

As shown in FIG. 5, a Text Orientation Module 520 communicates with an Orientation database 522. The Text Orientation Module 520 receives a text orientation selection made by the customer via the Text Orientation interface 224 and stores the information within the Text Orientation database 522. As is discussed below, the Text Orientation database 522 also includes product-dependent constraint information that limits the text orientation choices that may be selected by the customer via the Text Orientation interface 224.

As shown in FIG. 5, a Text Color Module 530 communicates with an Text Color database 532. The Text Color Module 530 receives a text color selection made by the customer via the Text Color interface 225 and stores the information within the Text Color database 532. As is discussed below, the Text Color database 532 also includes product-dependent constraint information that limits the text color choices that may be selected by the customer via the Text Color interface 225.

As shown in FIG. 5, an Image Treatment Module 540 communicates with a Treatment database 542. The Image Treatment Module 540 receives an image treatment selection made by the customer within the Image Treatments interface 226 and stores the information via the Treatment database 542. As is discussed below, the Treatment database 542 also includes product-dependent constraint information that limits the image treatment choices that may be selected by the customer via the Image Treatments interface 226.

As shown in FIG. 5, a Product Color Module 550 communicates with a Product Color database 552. The Product Color Module 550 receives a product color selection made by the customer via the Product Color interface 227 and stores the information within the Product Color database 552. As is discussed below, the Product Color database 552 also includes product-dependent constraint information that limits the product color choices that may be selected by the customer via the Product Color interface 227.

As shown in FIG. 5, a Product Size Module 560 communicates with a Size database 562. The Product Size Module 560 receives a product size selection made by the customer via the Product Size interface 228 and stores the information within the Size database 562. As is discussed below, the Size database 562 also includes product-dependent constraint information that limits the product size choices that may be selected by the customer via the Product Size interface 228.

As shown in FIG. 5, a Product Quantity Module 570 communicates with a Quantity database 572. The Product Quantity Module 570 receives a product quantity selection made by the customer via the Product Quantity interface 229 and stores the information within the Quantity database 572. As is discussed below, the Quantity database 572 also includes product-dependent constraint information that limits the product quantity choices that may be selected by the customer via the Product Quantity interface 229.

As shown in FIG. 5, an Image Creation Module 580 communicates with a Creation database 582. The Image Creation Module 580 receives image design information generated by a customer via the Drawing Tools interface 235 and stores the information within the Creation database 582. As is discussed below, the Creation database 582 also includes product-dependent constraint information that limits the design tools available to the customer within the Drawing Tools interface 235.

As shown in FIG. 5, a Template Module 590 communicates with a Template database 592. The Template Module 590 selects one or more product-dependent design "templates" for use with the Personalization Palette page 200. A template is a basic design (i.e., a default set of design components) that is provided to a customer of the Personalization Palette Page 200 for use as a starting point in creating his or her own set of design components. A template may include both product configuration options and enhancements, including one or more images, text messages, selected colors, typestyles, text locations, etc. For example, a business card template will generally include a number of text messages with a sample name, sample business address, sample phone number, sample fax number, sample electronic mail address, and sample logo. If the customer is happy with the typestyle, text location, text color, and so on, he or she can quickly create a personalized version of the business card. Alternatively, the customer can modify every one of these design components if he or she so desires. The template design components are preferably chosen to correspond to those design components that are most popular with past customers of the Personalization Palette for the product selected.

Each product on the web site 130 has one or more associated templates designed particularly for that product or class of products. These templates may be created by the host merchant of the web site 130 or they may be created by the manufacturers associated with the products. The Template database 592 contains these product design templates. Upon selection, a particular template is loaded into the Design Buffer 690 (see FIG. 6), wherein the associated default set of design components is incorporated by the Personalization Palette 150 into the Personalization Palette Page 200. That is, the default settings for the Typestyle, Text Color, Text Orientation, etc. will be presented to the user, as will any default images and text messages within the Main Window 230.

As shown in FIG. 2, the Personalization Palette Page 200 also provides an Upload button 251, a Shopping Cart button 252, a Save button 253, a Product Search Page button 254, a Check Out button 255, an Electronic Mail button 256, a Home Page link 257, an eCare button 270, and a Print button 260.

Selection of the Upload button 251 leads to a web page wherein the customer is given the ability to upload a design or image into the Personalization Palette 150 from his or her Personal Gallery database 330. Selection of the Shopping Cart button allows the customer to add a completed personalized product into his or her "shopping cart" for subsequent purchase. Selection of the Save link 253 allows the customer to save the current design in his or her Personal Gallery database 330. Selection of the Product Search Page button 254 leads to a web page wherein the customer is given the ability to browse and search for products to personalize. The details of this page are discussed further below with the help of FIG. 7. This transfer is preferably provided through a simple HTML hypertext link. Selection of the Check Out link 255 leads to a web page wherein the customer may purchase the items stored in his or her shopping cart. Software for managing electronic commerce shopping carts and purchases is well-known to those skilled in the art.

Selection of the Electronic Mail link 256 leads to an electronic mail interface wherein the customer may include additional information (e.g., an "attachment") to an electronic mail message being sent to another. This may be helpful for those customers who wish to solicit feedback on their recent creations. Software for implementing electronic mail transfer is well-known to those skilled in the art. Selection of the Home Page link 257 leads the customer to the home page of the web site 130. This transfer is preferably provided through a simple HTML hypertext link.

Selection of the eCare button 270 leads to a communication interface wherein a customer requiring assistance may interact with a representative of the web site 130. In one embodiment, this interaction is in the form of exchanged electronic mail messages. In another embodiment, this interaction is in the form of real-time chatting. Software for implementing both the electronic mail transfer and chat interaction is well-known to those skilled in the art. Selection of the Print button 260 allows a customer to print out a hardcopy version of the present design on a local printer in communication with his or her customer computer 110.

Figure 6:
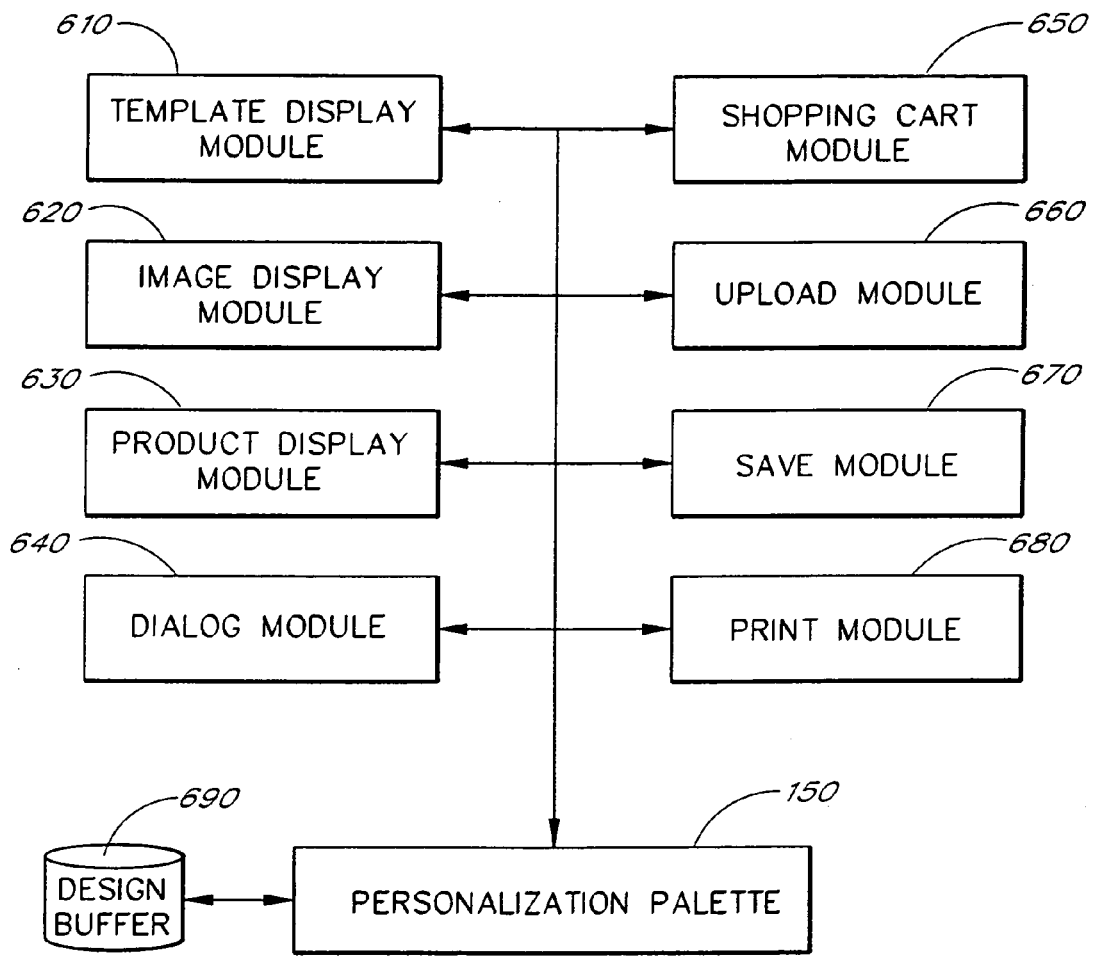
FIG. 6 is a block diagram of a module structure that facilitates the design of personalized products on the web site.

FIG. 6 illustrates one embodiment of a module structure that facilitates the design of personalized products on the web site 130. FIG. 6 depicts a Template Display Module 610, an Image Display module 620, a Product Display module 630, a Dialog module 640, a Shopping Cart Module 650, an Upload Module 660, a Save Module 670, a Print Module 680, and a Design Buffer 690. Each of these components is either incorporated within or in communication with the Personalization Palette 150.

The Template Display Module 610 displays product design templates within the Main Window 230 of the Personalization Palette Page 200. In one aspect, templates are displayed in a "browse" mode, wherein multiple templates are displayed simultaneously for consideration by a customer beginning the design process. In another aspect, only one template is displayed in the Main Window 230. These views are presented to a customer upon entering the Personalization Palette Page 200 after selecting a product. The Template Display Module 610 preferably displays images assembled by Sun Microsystems' Java™ Advanced Imaging API to display templates within the Main Window 230. Alternatively, the Template Display Module 610 may construct HTML code for this purpose. Pictorial images are preferably converted to either the JPEG or GIF format for use with the Java™ applets or HTML code. The Template Display Module 610 further comprises a raster image processor (RIP), such as Handmade Software's Image Alchemy. The Template Display Module 610 can position, orient, and display text within the design. In one embodiment, text is converted into a GIF image that is treated like any other pictorial image included in the design. In another embodiment, the text is displayed in the design as a text field that may be edited in place by a customer. Text may be displayed using well-known software, such as Bitstream Web Fonts and Microsoft TrueType.

The Template Display Module 610 preferably displays products and designs in a "What You See Is What You Get" (WYSIWYG) fashion, so that the various design components are presented to the customer on his or her computer monitor as they would appear on a finished personalized product bearing the template design. The Template Display Module 610 preferably comprises traditional image rendering and manipulation tools that allow customers to attain different views of the template design. For three-dimensional objects, the Template Display Module 610 preferably may provide a three-dimensional view of the product with the template design incorporated. For example, a template including a logo on a golf ball is preferably displayed so that the logo appears to the customer to follow the contours of the golf ball. The image manipulation tools may be comprised from well-known software, such as Adobe Photo-Shop®, Adobe Illustrator®, Corel Draw®, and Corel Photopaint®.

The Template Display Module 610 preferably allows a customer to choose to display a template generically (without the product), or as incorporated within the selected product. For many products, the latter display can be either a two- or three-dimensional view.

Modules analogous to the Template Display Module preferably exist for non-pictorial personalization. For example, a Template Audio Module (not shown) preferably plays template audio files associated with personalized sound products (e.g., an alarm clock with a personalized wakeup message). Similarly, a Template Video Module (not shown) preferably plays template video files (animation, streaming video, MPEG, etc.) associated with personalized video products.

The Image Display Module 620 displays images within the Main Window 230 of the Personalization Palette Page 200. In one aspect, images are displayed in a "browse" mode, wherein multiple images are displayed simultaneously for consideration by a customer in search of images for incorporation in a design. In another aspect, only one image is displayed in the Main Window 230. The Image Display Module 620 preferably comprises an RIP and Java™ applets to display images and text within the Main Window 230. Alternatively, the Image Display Module 620 may use HTML code in place of the applets for this purpose.

Like the Template Display Module 610, the Image Display Module 620 preferably displays images and text incorporated into designs in a WYSIWYG fashion and incorporates traditional two- and three-dimensional image manipulation tools. For example, an image placed on a coffee mug is preferably presented as wrapping around the mug. And, as noted above for templates, modules analogous to the Image Display Module 620 preferably exist for non-pictorial (e.g., audio and video) personalization.

The Product Display Module 630 displays depictions of products associated with the web site 130 within the Main Window 230 of the Personalization Palette Page 200. In one aspect, products are displayed in a "browse" mode, wherein multiple images are displayed simultaneously for consideration by a customer in search of products to personalize. In another aspect, only one product is displayed in the Main Window 230. The Product Display Module 630 preferably comprises an RIP and Java™ applets to display images within the Main Window 230. Alternatively, the Product Display Module 630 may use HTML code in place of the applets for this purpose.

Like the Template Display Module 610, the Product Display Module 630 preferably displays depictions of products in a WYSIWYG fashion, and incorporates traditional two- and three-dimensional image manipulation tools. For example, a depiction of a coffee mug is preferably a three-dimensional rendering with accurate size and color.

The image display modules 610, 620, 630 combine the various design components (e.g., product images, design images, incorporated text messages, sizing and position information, etc.) so as to compose one image for display to the customer. In one embodiment, a composition engine located within one or more of the display modules 610, 620, 630 generates this composition. In another embodiment, a separate composition engine in communication with the display modules 610, 620, 630 generates this composition. The composition engine may be comprised from well-known production software, such as Bitstream's Page-Flex™, Adobe's InDesign®, and PrintSoft's PReS.

All three display modules 610, 620, 630 preferably further include a color module that uses "color management" techniques to enable the depiction of true color to the customer at a user computer 110. The color engine may be comprised from well-known production software, such as Imation's Verifi™ and Akamai's Ecolor™.

The Dialog Module 640 displays text messages within the Dialog Box 240 of the Personalization Palette Page 200. The Dialog Module 640 preferably selects one text message from a set of messages stored in a Dialog database, and displays the selected message in the Dialog Box 240. The text message selected is determined by the customer's activities. For example, when a customer places his or her cursor above the Text Orientation interface 224, the Dialog Box 240 assists the customer by presenting a message describing the operation of that interface.

In one embodiment, the Dialog Module 640 also assist customers with the design process itself. For example, the Dialog Module 640 may present customers with a message disclosing the most popular text colors or typestyles selected by prior customers of a particular product. The Dialog Box may also make suggestions for certain design components determined by professional designers to be aesthetically pleasing.

The Shopping Cart Module 650 stores a personalized product creation in a customer's shopping cart in response to the customer's selection of the Shopping Cart button 252. Once in the shopping cart, the personalized product will remain until it is either purchased by the customer or removed from the cart. Software for managing electronic commerce shopping carts and purchases is well-known to those skilled in the art.

The Upload Module 660 uploads images from the Image databases into an image depository in response to the customer's selection of an image within the Image Galleries 210. Images loaded into the image depository may be incorporated, via pointer information, into the designs created within the Personalization Palette Page 200. The Upload Module 660 also provides an HTML link that provides access to the Personal Gallery 213 from selection of the Upload Button 251.

In one embodiment, when loading a design saved previously, the Upload Module 660 may, upon selection of the customer, load either a generic version of the design or a version conformed to the product with which it was saved.

The Save Module 670 saves a set of design components in a customer's Personal Gallery database 330 in the eXtensible Markup Language (XML) format in response to the customer's selection of the Save button 253. The information stored includes pointers that identify any images incorporated from the various image galleries, text and image positioning information, text and image sizing information, product SKU information, product color, size, and quantity information, and so on.

The Print Module 680 causes printing of a "proof" of the current design in the Personalization Palette 150 on a printer local to the customer. The Print Module 680 preferably converts the design information (including image and text content, positioning information, etc.) into a PostScript or Encapsulated PostScript file and then transfers this file over the Internet 120 to the customer's user computer 110.

The Design Buffer 690 contains the design component information generated during a particular design session. Thus, when the Template Module 590 retrieves a default set of design components from the Template Database 592, the information is stored in the Design Buffer 690. Changes in existing design components and additions of new design components are stored in the Design Buffer 690 as well. At any point in time, the Design Buffer 690 contains the latest version of the customer's product design. Optionally, the Design Buffer 690 may also retain information on recent product designs as well. In one embodiment, for example, the customer may select an "Undo" button in order to return to erase the latest design change. Furthermore, the depiction presented to the customer via the display modules 610, 620, 630 is derived from the information stored in the Design Buffer 690. The Design Buffer 690 is not a permanent source of storage, however. In order to retain a set of design components for later use, a customer must store the set in his or her Personal Database 330 using the Save Module 670, as discussed above.

C. Product Selection As noted above, the web site 130 is associated with an assortment of product selections for products that may be personalized and purchased by consumers. The assortment of products may be presented in many different forms, such as one or more menus or web-based hyperlink directories. The assortment is preferably presented to customers in categories. One embodiment of an assortment of product selections, presented as a hyperlink directory, is depicted in the Product Page 700 shown in FIG. 7. The Product Page 700 may be accessed directly from the Personalization Palette Page 200 by selection of the Product Search Page button 254.

Figure 7:
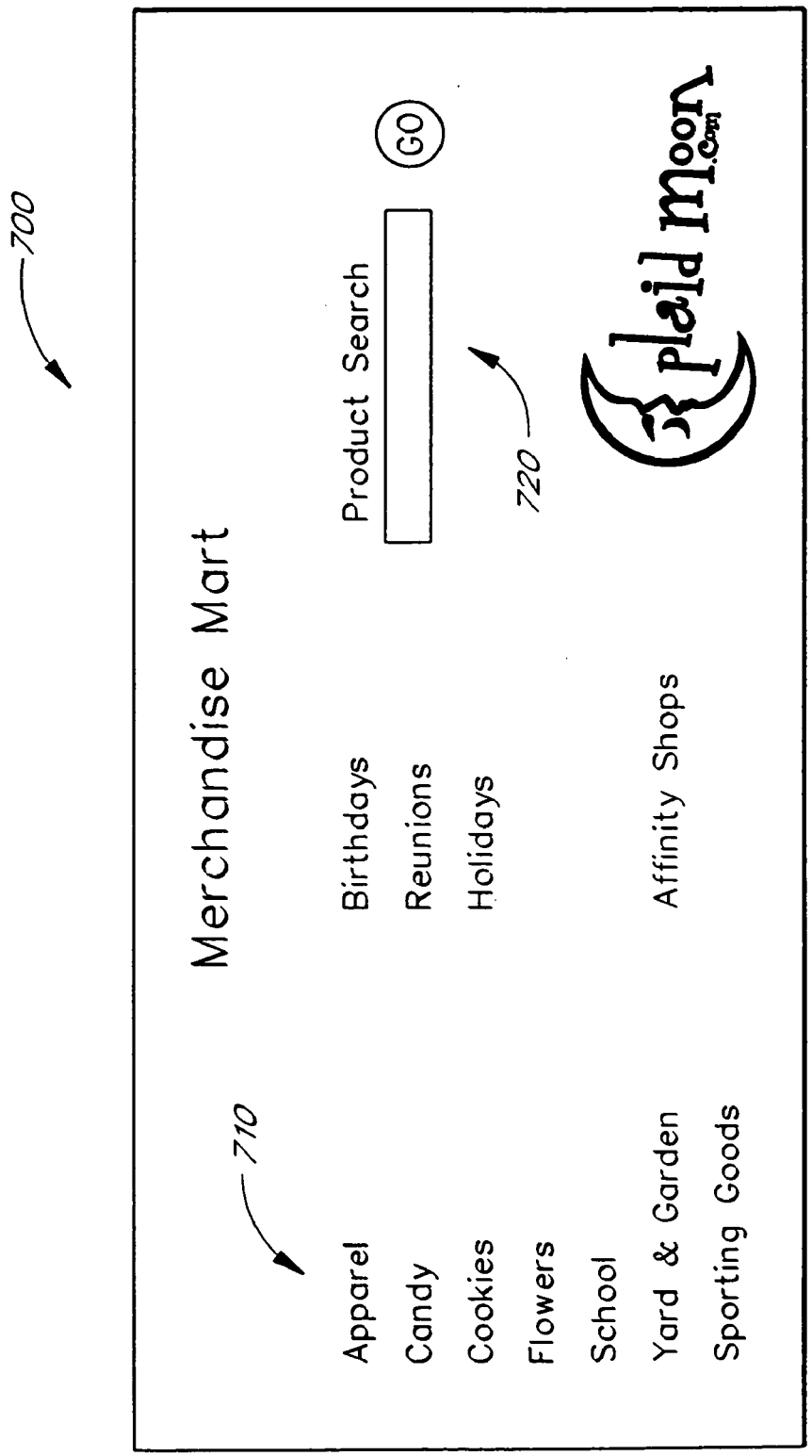
FIG. 7 illustrates one embodiment of a customer interface containing product categories that may be browsed by visitors.

Visitors may navigate the directory tree and browse the various products via the communication network 120 using a web browser on their user computers 110. The products are presented to visitors in Product Categories 710. Some categories are based on the nature of the products enclosed; other categories are based on themes. As shown in FIG. 7, example categories include Apparel, Candy, Cookies, Flowers, Sporting Goods, School, Yard & Garden, Household, Gifts, Identification, Stickers, Paper, Elegant Gifts, Cheesy Gifts, Holidays, Reunions, and Birthdays. Products may also be categorized on the basis of price, manufacturer, or brand name. Products may also be categorized on the basis of their connection to Affinity Shops. For example, the Sierra Club could include a series of environmentally-friendly products that its supporters could personalize using the web site 130.

Figure 8:
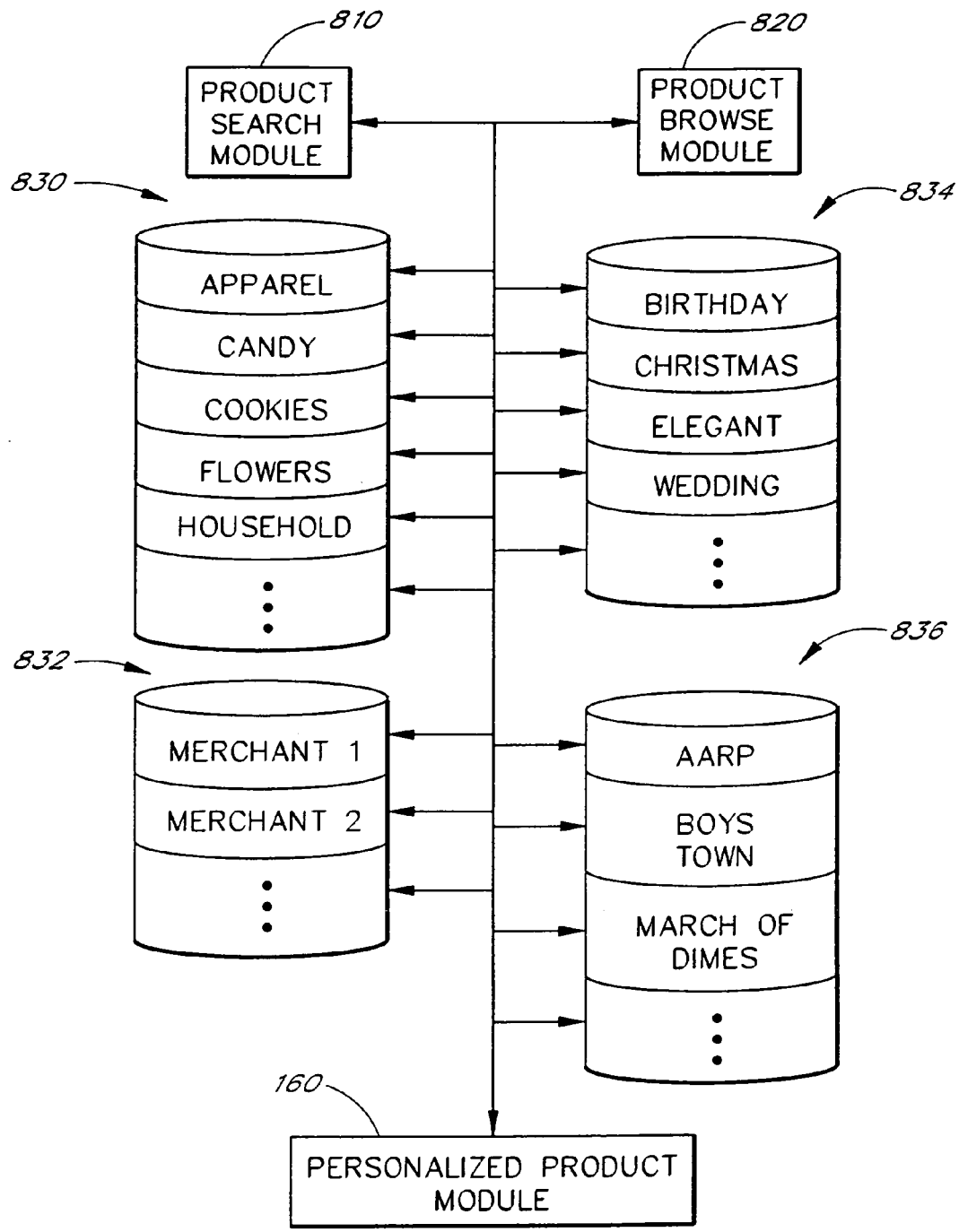
FIG. 8 is a block diagram of a system that allows a customer to browse the various Product Categories of the web site.

FIG. 8 illustrates one embodiment of a database structure in communication with the Personalized Product Module 160 that allows a customer to browse the various Product Categories of the web site 130. As shown in FIG. 8, product information is contained in multiple subject-based databases 830, in multiple merchant-based databases 832, in multiple theme-based databases 834, and in multiple Affinity-based databases 836. In this embodiment, these databases correspond to the like-named Product Categories 710 depicted in FIG. 8. An individual product satisfying multiple categories (e.g. an item of apparel that is associated with an Affinity Shop) may be reproduced in multiple databases or, alternatively, may be cross-indexed so as to indicate a connection to multiple pertinent databases.

As shown in FIG. 8, a Product Browse Module 820 is in communication with each of the product databases. In one embodiment, the Product Browse Module 820 is incorporated within the Personalized Product Module 160. In another embodiment, the Product Browse Module 820 is in communication with the Personalized Product Module 160. The Product Browse Module 820 receives customer selections of product categories (and, if appropriate, subcategories) and displays the appropriate results. In one embodiment, the results are presented by directing the customer's browser to a new web page containing the relevant information. In an alternative embodiment, the results are presented by opening up a new web browser page containing the relevant information. The appropriate information is generally either a list of product subcategories within the selected category or a display of product information. Product information preferably includes an image of the product with associated descriptive text. If all of the product information within the selected category or subcategory cannot be simultaneously displayed within one web page, well known web-based techniques, such as slide bars, may be used to allow the customer to browse all of the product information.

A customer may select a product from the assortment of product selections by, for example, clicking on a web-based "Click-to-Personalize" button associated with that product. Selecting a product sends an identifier of the selected product (e.g., an identification code, or an analogous proxy, uniquely associated with that product) to the Personalized Product Module 160. In response, the Personalized Product Module 160 identifies the product selected by the customer as the "Selected Product" that is to be personalized.

As noted above, the web site 130 preferably includes ancillary textual descriptions for each product available on the site. Some or all of this text may preferably be read by visitors browsing the product web pages. In one embodiment, shown in FIG. 7, the Product Page 700 further includes a Product Search interface 720 that allows a customer to search for a product within the various Product Categories having some quality of interest. The Product Search interface 720 includes a query field within which a customer may enter a search query, and a search initiation button, depicted as a "GO" button in FIG. 7, that initiates a search based upon the entered search query.

The search for the most relevant products associated with the search query is conducted by a Product Search Module 810, shown in FIG. 8 in communication with the various product databases. In one embodiment, the Product Search Module 810 is incorporated within the Personalized Product Module 160. In another embodiment, the Product Search Module 810 is in communication with the Personalized Product Module 150. The Product Search Module 810 receives customer search queries from the Product Search tool 720 and displays the appropriate search results. The Product Search tool 720 is preferably replicated on each product web page within the Product Category 710 directory tree.

The Product Search Module 810 identifies and prioritizes products that are relevant to the search by comparing the submitted search query to the ancillary description associated with each product. This comparison may be done in the same manner as is discussed above for the Image Search Module 310.

In one embodiment, the Product Search Module 810 will search all of the product categories associated with the web site 130. In another embodiment, the customer has the option of specifying one or more product categories (e.g., the Sierra Club Affinity Shop) for searching.

C. Product-Based Constraints

The products included within the web site 130 may be personalized by the selection of product features (e.g., color, size, etc.) and the addition of text, images, audio, video, and the like. However, the customizing capabilities of vendors varies widely depending upon the nature of the product being personalized. For example, a customer adding text and a logo onto a personalized golf ball will face much greater size constraints than another customer adding text and a logo onto a T-shirt. Furthermore, different vendors for the same product may have different customizing capabilities. One vendor of customized T-shirts, for example, may have the ability to incorporate more colors into a design than a second T-shirt vendor. This latter vendor may, however, have the ability to incorporate designs in more locations within the shirts than the former vendor.

Given these potential problems, the production of an end product that is satisfactory to the customer requires that the manufacturing limitations of the vendors be taken into account at the design stage. As such, the Personalization Palette 150 and Personalized Product Module 160 interact so as to ensure that the customer does not design and order a personalized product that is outside of the capabilities of the vendors creating that product.

The manufacturing/customizing capabilities of the vendors of the various products are stored within the web site 130. In one embodiment, the capabilities information is stored within the Product databases 830, 832, 834, 836. In another embodiment, the manufacturing capabilities information is stored within separate databases in communication with the Personalized Product Module 160.

Herein, the term "manufacturing capabilities" refers to those parameter values, formats, conditions, etc., associated with manufacturing, customizing, production, pre-production, post-production, finishing, incorporating files, images, text, audio, video, and the like, that are within the capabilities of a vendor. Preferably the manufacturing capabilities are determined for the various vendors by the vendors themselves.

In one embodiment, the manufacturing capabilities of each vendor for each product are determined by soliciting the information directly from the vendors. A vendor must submit responses to a number of questions covering various manufacturing/customizing capabilities to the host merchant of the web site 130 before the vendor's products are included within the web site 130. Sample questions from a constraint questionnaire are provided in Tables 1–8. The constraint questionnaire may be provided to vendors using any means, including a hardcopy, an electronic mail message, or a web-based form on the Internet.

TABLE 1

Product Information

| Question | Example Answers | Preferred Standard |
| --- | --- | --- |
| What is the SKU number? | 001-123XYZ. | |
| What colors are available for the product? | White. Yellow Pink Blue. | |
| What sizes are available for the product? | Small. Medium. Large. | |

TABLE 2

Fonts

| Question | Example Answers | Preferred Standard |
| --- | --- | --- |
| What font formats do you accept? | Type 1. True Type. Multi Master. | Type 1 |
| Minimum size producible | 6 pt san serif font. 8 pt serif font. | |
| Font limitations | Only helvetica. Any post-script typeface | |

TABLE 2-continued

Fonts

| Question | Example Answers | Preferred Standard |
| --- | --- | --- |
| What sizes are available? | Any. Only 10 Pt. | |
| Do you accept embedded, referenced, or outlined fonts? | No. Embedded. | Embedded. |
| Do you accept style modification through the palette? | Yes. No. Just italics. | Yes. |

TABLE 3

Images

| Question | Example Answers | Preferred Standard |
| --- | --- | --- |
| What file formats do you accept? | EPS. EPSF. TIFF. JPEG. PDF. DCS. | Composite PDF. |
| What Image mode do you accept? | 1-Bit. Monotone. Gray scale. RGB. CMYK. LAB. | All supported by PDF. |
| Resolution range. | 300–600 dpi. | |
| What image locations do you allow? | Front of shirt Back of shirt Sleeve of shirt | |
| Can you orient images at any angle? | Yes No | |
| What special image attributes do you accept? | White background. Transparency. Clipping. Rotation. Transformations. | All supported by PDF. |
| Any special compression encoding requirements? | JPEG level 4. Can't do TIFF type 2. Binary, ASCII. Level 1. | All supported by PDF. |

TABLE 4

Production

| Question | Example Answers | Preferred Standard |
| --- | --- | --- |
| What is your production process? | Flow chart with technologies indicated. | |
| What color methods do you use? | Process. Spot. RGB. | |
| Does Dlx need to generate registration marks? | Registration target. | No. |
| What LPI values do you support? | 85–133 lpi. | Larger is better. |
| What custom screen values do you accept? | None, we override. | All. |
| What are your trapping requirements? | Vendor will trap. Plaid Moon will trap. | Vendor will trap. |
| What is the resolution of your digital device? | 1200 dpi. 300-by-600 dpi. | |
| What is your imaging technology? | Digital ink jet. Dry toner. Chisel. | |

TABLE 4-continued

Production

| Question | Example Answers | Preferred Standard |
|---|---|---|
| What device specific language do you send to your imaging device? | Postscript. PDF. Metacode. AFP. | Postscript of PDF. |
| Minimum forward line weight requirements? | 0.005" | Lower is better. |
| Minimum reverse line weight requirements? | 0.005" | Lower is better. |
| Who does separations? | Vendor. Plaid Moon. | Vendor. |
| How much bleed is required? | No bleed. 1/16" trim is taken. | |
| Maximum image size? | 4"-by-6" | |
| Any trims required? | Yes - 1/16" | |
| What color Management System do you use? | None. ICC profiles. | ICC. |
| Do you support OPI techniques? | No. | OPI. |
| Who compensates for dot gain? | Plaid Moon. Vendor experiences a 12% gain at 50% | Vendor. |
| What job ticket format do you use? | PJT. XML. Proprietary. | XML |

TABLE 5

Production - Process Color

| Question | Example Answers | Preferred Standard |
|---|---|---|
| What screen angles do you standardize on? | C = 75, M = 85, Y = 105, K = 45. | |

TABLE 6

Production - Spot Color

| Question | Example Answers | Preferred Standard |
|---|---|---|
| What are your knock our requirements? | Required. None, we overprint black. | None. |
| What color names do we need to use? | PMS 123. Blue. | PMS. |
| How do you handle images? | We print them as a specified spot color. | |

TABLE 7

Personalize Image

| Question | Example Answers | Preferred Standard |
|---|---|---|
| What format? | PDF. Assembly list. XML | Composite PDF or XML Assembly List. |
| Who does assembly? | Vendor. Web Site. | |

TABLE 8

Impositions

| Question | Example Answers | Preferred Standard |
|---|---|---|
| Who does impositions? | Plaid Moon does it. Vendor does it. | Vendor does it. |

Figure 9:
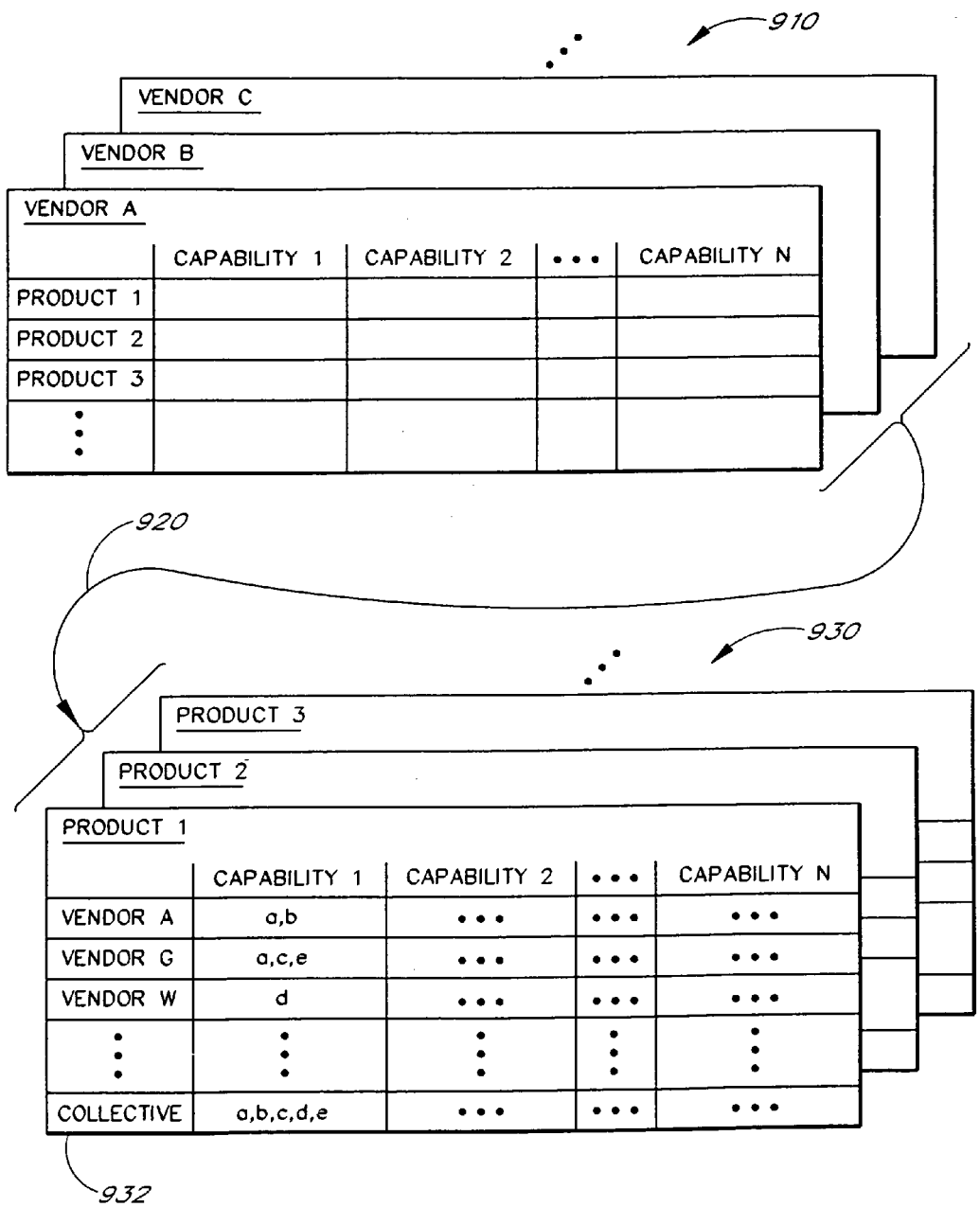
FIG. 9 illustrates manufacturing capabilities for personalizable products in two different formats.

FIG. 9 illustrates one embodiment in which the constraint information is stored in two formats. First, the vendor responses from the constraint questionaires may be easily converted into a set of Vendor Records 910, where each individual Vendor Record 910 is associated with a particular vendor. Each Vendor Record 910 contains one or more products, shown in FIG. 9 for Vendor A as Product 1, Product 2, Product 3, . . . , indicating the set of products personalized by that particular vendor. For each of these products, the Vendor Record 910 depicts N entries, shown in FIG. 9 in columns labeled Capability 1, Capability 2, Capability 3, . . . , containing the manufacturing capabilities information for that product. Each capability is associated with a discrete aspect of the design process, such as font type, font color, font style, etc. The capabilities information (alternatively referred to as "constraint information") may be maintained in several different forms. Capabilities may be identified positively (e.g., allowed font colors are red, green, blue, yellow, cyan, and magenta), negatively (e.g., font size cannot be smaller than 10-point), yes/no (e.g., "can you print mirror-reversed?"=yes), and mixtures of these.

In one embodiment, the capabilities information contained in the set of Vendor Records 910 may be mapped 920 into a set of Product Records 930, where each individual Product Record 930 is associated with a particular product. Techniques for mapping 920 the capabilities information from one format to the other are well known in the art.

Each Product Record 930 contains one or more vendors, shown in FIG. 9 for Product 1 as Vendor A, Vendor G, Vendor W, . . . , indicating the set of vendors who personalize that particular product. For each of these vendors, the Product Record 930 depicts N entries, shown in FIG. 9 in columns labeled Capability 1, Capability 2, Capability 3, . . . , containing the manufacturing capabilities for that product associated with that vendor.

Each Product Record 930 further includes information, shown in FIG. 9 as the row labeled Collective 932, on the manufacturing capabilities of the associated vendors considered as a collective unit. That is, the Collective vendor 932 may be thought of as an "enhanced" vendor who has every manufacturing capability possessed by any one of the vendors associated with the product. For example, consider the Product Record 930 Capability 1 information shown in FIG. 9. The letters a, b, c, d, and e represent different manufacturing capabilities (e.g., font types, color options, etc.) possessed by vendors of Product 1. Vendor A has the capability of doing a and b. Vendor G has the ability to do a, c and e. Vendor W has the ability to do only d. The Collective vendor, having the collective abilities of Vendors A, G and W, can therefore do a, b, c, d, and e.

As will be discussed below, the manufacturing capabilities stored in the various Product Records 930 are used to limit the design components available to customers of the Personalization Palette Page 200. In particular, when a customer selects a particular product to personalize, the capabilities of the Collective vendor associated with that product are presented to the customer within the Personalization Palette Page 200. If, on the other hand, a customer begins creating a design without having first selected an associated product, the Personalization Palette Page 200 will not be limited by the capabilities of the vendors. In this latter situation, in one embodiment, the capabilities of a "super" vendor, corresponding to the collective capabilities of all vendors for all products, is presented to the customer. That is, any typestyle, color scheme, text orientation, etc. within the abilities of any vendor will be available to the customer. In another embodiment, a customer in this latter situation, is presented with default options that do not correspond to the capabilities of the "super" vendor.

The Vendor Records 910 and Product Records 930 are stored in one or more databases in communication with the Personalized Product Module 160. In one embodiment, the Product Record 930 for a given product is stored within the appropriate Product database 830, 832, 834, 836 for that product.

FIG. 9 illustrates merely one embodiment for storing the manufacturing constraint information. Numerous other possibilities would be apparent to one skilled in the art. The constraint information could, for example, be stored in a "three-dimensional" database, wherein each product-vendor dyad is associated with N manufacturing capabilities.

FIG. 10 illustrates a sample set of Product Records 1010, 1020, 1030 for different styles of baseball caps. Vendors A and B have submitted constraint questionnaires to the host merchant of the web site 130 indicating that each personalizes Style 1 baseball caps. For simplicity, FIG. 10 only depicts three of the N manufacturing capabilities associated with the Personalization Palette 150: Message Limit, Typestyles, and Text Color. A full version of the Product Record 1010 would of course include all N constraints.

Referring to FIG. 10, Vendor A can incorporate text messages up to 30 characters in length into its Style 1 baseball caps, while Vendor B can only incorporate text messages up to 25 characters in length. In practice, the Product Record 1010 may include separate character length restrictions depending upon the location of the text within the product (e.g., on the front of a T-shirt or on the sleeve), upon the font size (e.g., 10-point, 12-point, etc.), and upon the font type (Courier, Times New Roman, etc.). Referring to FIG. 10, both vendors can incorporate the Courier, Tahoma, and Times New Roman fonts; Vendor A can also use the Arial font, and Vendor B can also use the Verdana.font. Regarding text color, each vendor uses the different color palettes depicted in FIG. 10.

As noted above, each product of the web site 130 includes one or more templates that provide a starting point for customers designing personalized versions of the product. These templates, created by either the vendors of the associated products or by the host merchant of the web site, are stored in the Templates database 592.

D. Adapting the Personalization Palette

Figure 11:
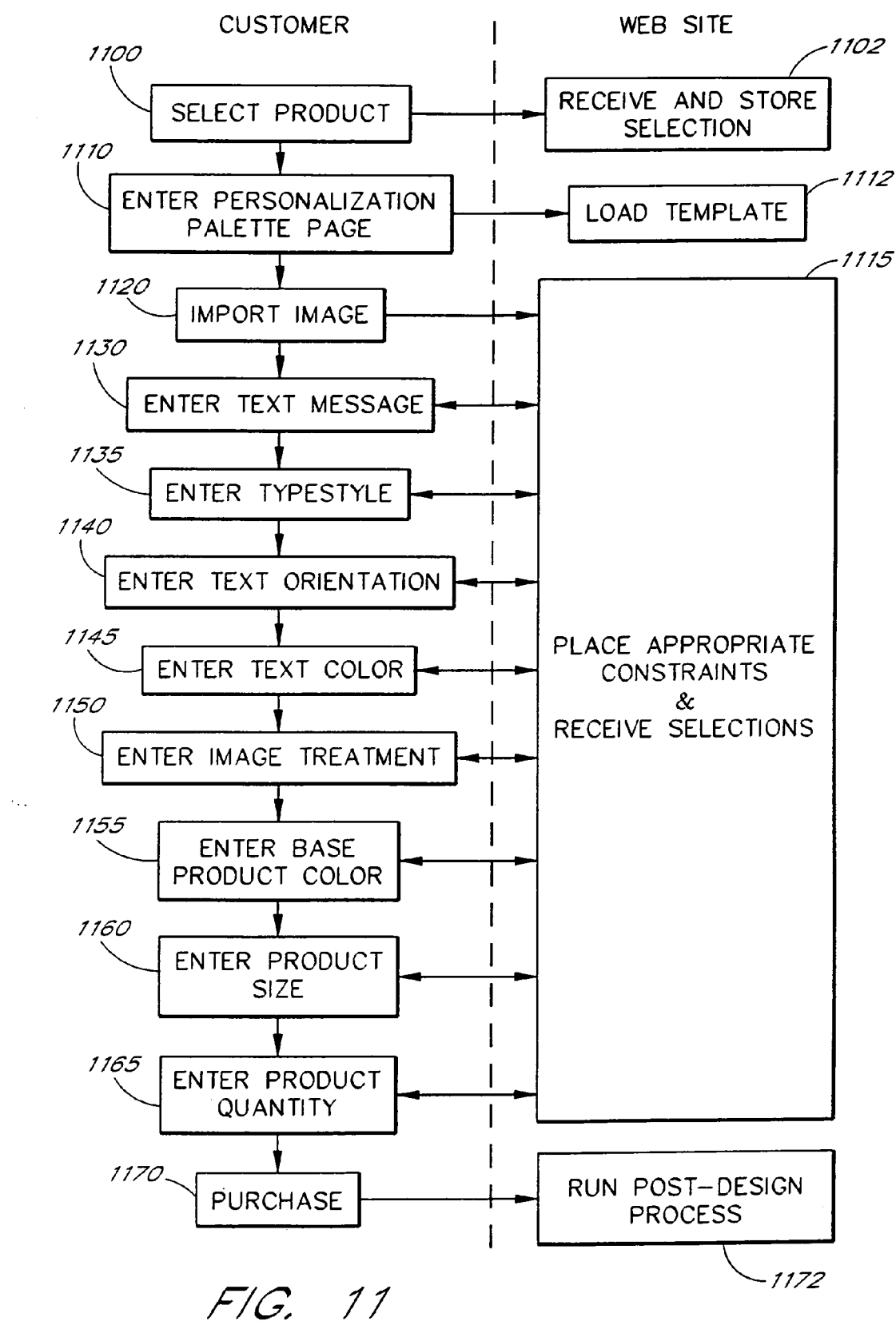
FIG. 11 is a flow chart depicting a process for the adaptation of the Personalization Palette for a customer designing a personalized product.

The Personalization Palette 150 is "intelligent" in that it adapts the design components available to visitors of the Personalization Palette Page 200 to account for the manufacturing capabilities associated with the product being personalized. FIG. 11 illustrates a flow chart depicting this adaptation for a customer designing a personalized product on the web site 130. The left hand column of boxes depicts actions of a customer, while the right hand column depicts actions of the web site 130.

Referring to FIG. 11, in State 1100 the customer selects a product that he or she wishes to personalize. As noted above, the customer may identify the product by browsing the Product Categories 710 or by searching for products associated with a search query using the Product Search interface 720. In one embodiment, the customer selects a product by providing a selection message to the web site 130. This selection message may be provided in many ways, preferably by clicking on a web page "Click-to-Personalize" button associated with the product of interest.

In State 1102, the Personalized Product Module 160 receives the customer's selection of the Click-to-Personalize button. In response, the Personalized Product Module 160 identifies the product selected by the customer as the "Selected Product" that is to be personalized. In one embodiment, selection of the Click-to-Personalize button also immediately relocates the customer to the Personalization Palette Page 200.

In State 1110, the customer enters the Personalization Palette Page 200 by loading the appropriate web page into the customer's web browser. In one embodiment the customer enter the page by selecting a link to the Personalization Palette Page 200. In another embodiment, the Personalization Palette Page 200 is automatically loaded for the customer upon selection of the Click-To-Personalize button.

Figure 12:
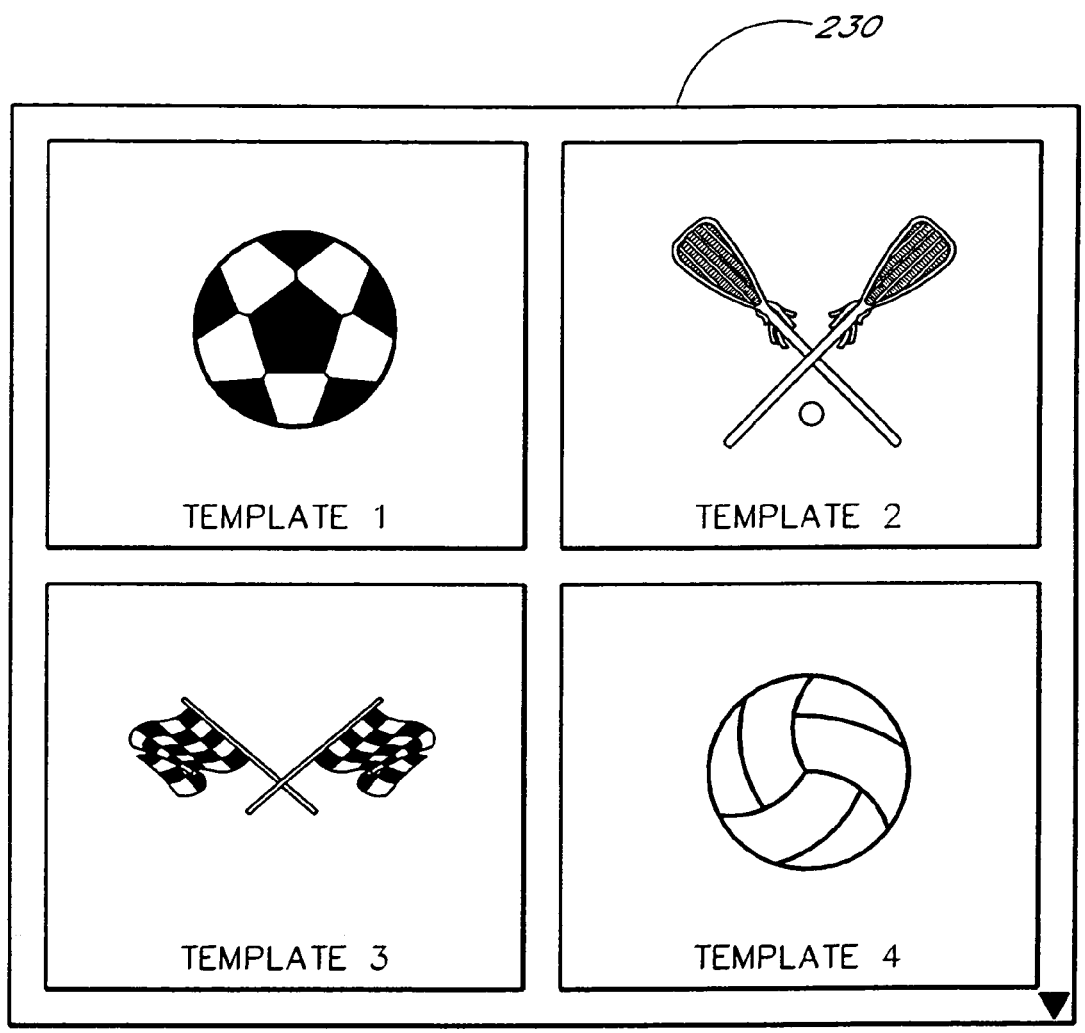
FIG. 12 illustrates one embodiment of a display showing four different templates associated with a product selected by a customer.

In State 1112, the Template Module 590 retrieves one or more templates associated with the Selected Product from the Template database 592. The Template Display Module 610 loads one or more of these retrieved templates into the Main Window 230 of the Personalization Palette Page 200. FIG. 12 illustrates one embodiment in which four templates (with a sports theme) associated with the Selected Product are displayed within the Main Window 230 for consideration by the customer. The customer may select one of these templates, for example by clicking a "select" button associated with the template, as the starting point for designing the personalized version of the Selected Product. Alternatively, the customer may reject all of the offered templates and create a design from scratch.

State 1115 represents the process wherein the Personalization Module 150 and Personalized Product Module 160 conform the Personalization Palette Page 200 so as to incorporate the manufacturing capabilities embodied in the Product Record for the Selected Product. As discussed in detail below, this adaptation involves each of the design tool interfaces used by customers to design personalized products.

In one aspect of State 1115, the Image Creation Module 580 retrieves the proper image locations, sizes, and orientations for the Selected Product from the Creation database 582 and constrains the image loading interface accordingly, so as to limit the location, size, and orientation of the image incorporated by the customer in State 1120. In State 1120, the customer selects an image that he or she wishes to incorporate into the Selected Product. The customer may identify the image by browsing the Image Galleries 210 or by searching for images associated with a search query using the Image Search interface 221. In State 1120, the customer further provides size, position, and orientation information for the selected image via the image loading interface as adapted in State 1115. All design information entered by the customer is stored in the Design Buffer 690, as discussed above.

The image size, position, and orientation constraints are determined in State 1115 by the corresponding entries in the Product Record for the Selected Product. If that Product Record includes only one vendor, the manufacturing capabilities of that vendor will be controlling. If that Product Record includes multiple vendors, there are multiple embodiments for determining the proper constraint. Preferably, the constraint is then determined from the "Collective"

entry on the Product Record. That is, a constraint defined by the manufacturing capabilities of all of the vendors considered as a group is utilized.

Figure 13A:
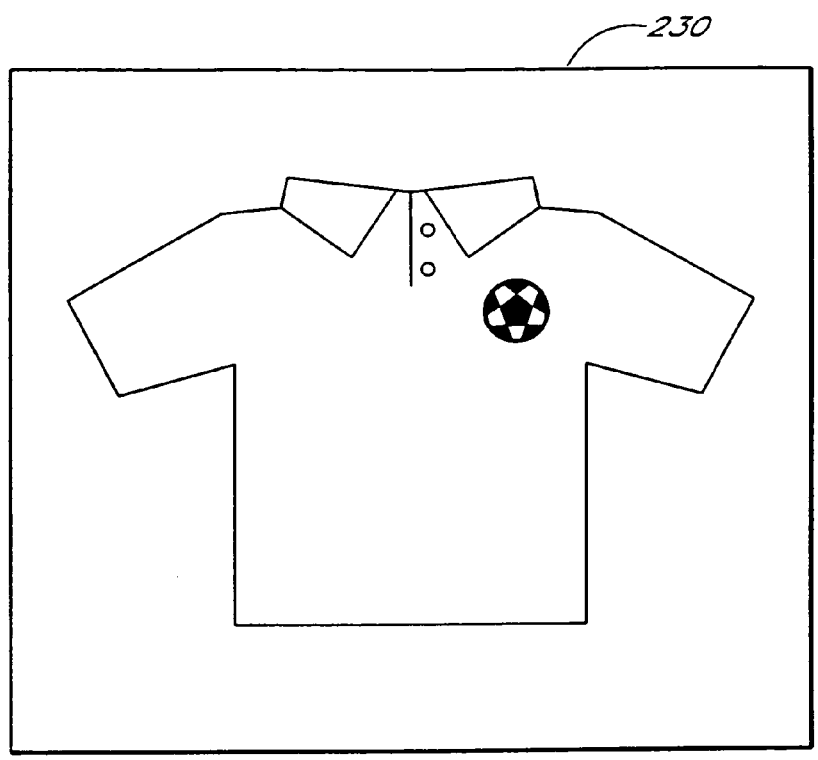
FIGS. 13A and 13B illustrate embodiments of a display showing a design superimposed onto a product selected by a customer.
Figure 13B:
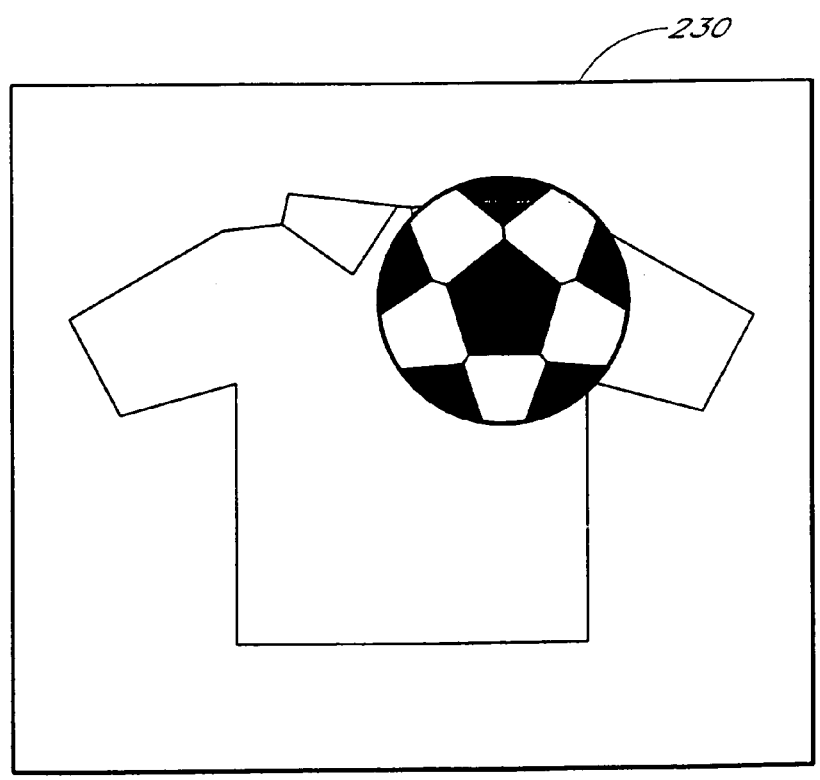

Once the image has been incorporated with a size, position, and orientation in compliance with the vendor constraints, the Image Display Module 620 loads the retrieved image into the Main Window 230 of the Personalization Palette Page 200. FIG. 13A illustrates one embodiment wherein the Image Display Module 620 and Product Display Module 630 cooperate to generate within the Main Window 230 a display of the selected image (a soccer ball) superimposed onto the Selected Product (a shirt) in a manner in compliance with the constraints. FIG. 13B illustrates another embodiment, wherein the two modules cooperate to generate within the Main Window 230 a magnified version of the selected image superimposed onto the Selected Product.

In one embodiment, the images available to the customer within the Image Galleries is limited to those images having a size and resolution appropriate for the Selected Product. For example, a customer designing a personalized golf ball may be presented with only those images that are small enough to reasonably incorporate onto such a small object. In another embodiment, the image size and resolution are adapted to fit the selections of the customer.

In another aspect of State 1115, the Message Entry Module 500 retrieves the proper message text length for the Selected Product from the Message database 502 and constrains the Message Entry interface 222 accordingly, so as to limit the length of the message that may be entered by the customer in State 1130. In State 1130, the customer enters a message into the Message Entry interface 222 as adapted in State 1115.

The text message constraint is determined by the corresponding entry in the Product Record for the Selected Product, as discussed above. In FIG. 10, for example, the 30-character capability of Vendor A would be used over the more restrictive 25-character capability of Vendor B. In an alternative embodiment, the customer may select one of the multiple vendors to be the "vendor of choice" to produce the personalized product. The capability associated with that vendor is then used as the constraint.

In another aspect of State 1115, the Typestyle Module 510 retrieves the proper set of available typestyle options for the Selected Product from the Typestyle database 512 and constrains the Typestyle interface 223 accordingly. The typestyle constraint is determined from the corresponding entry in the Product Record for the Selected Product, in the same manner as is discussed above for the Message Entry. In State 1135, the customer accesses the Typestyle interface 223. The customer then selects one of the typestyle options presented in the Typestyle interface 223 as adapted in State 1115.

In another aspect of State 1115, the Text Orientation Module 520 retrieves the proper set of available text orientation options for the Selected Product from the Orientation database 522 and constrains the Text Orientation interface 224 accordingly. The text orientation constraint is determined from the corresponding entry in the Product Record for the Selected Product, in the same manner as is discussed above for the Message Entry. In State 1140, the customer accesses the Text Orientation interface 224. The customer then selects one of the text orientation options presented in the Text Orientation interface 224 as adapted in State 1115.

In another aspect of State 1115, the Text Color Module 530 retrieves the proper set of available text orientation options for the Selected Product from the Text Color database 532 and constrains the Text Color interface 225 accordingly. The text color constraint is determined from the corresponding entry in the Product Record for the Selected Product, in the same manner as is discussed above for the Message Entry. In State 1145, the customer accesses the Text Color interface 225. The customer then selects one of the text color options presented in the Text Color interface 225 as adapted in State 1115.

In another aspect of State 1115, the Image Treatment Module 540 retrieves the proper set of available image treatment options for the Selected Product from the Treatment database 542 and constrains the Image Treatments interface 226 accordingly. The image treatment constraint is determined from the corresponding entry in the Product Record for the Selected Product, in the same manner as is discussed above for the Message Entry. In State 1150, the customer accesses the Image Treatments interface 226. The customer then selects one of the image treatment options presented in the Image Treatments interface 226 as adapted in State 1115.

In another aspect of State 1115, the Product Color Module 550 retrieves the proper set of available product color options for the Selected Product from the Product Color database 552 and constrains the Product Color interface 227 accordingly. The product color constraint is determined from the corresponding entry in the Product Record for the Selected Product, in the same manner as is discussed above for the Message Entry. In State 1155, the customer accesses the Product Color interface 227. The customer then selects one of the product color options presented in the Product Color interface 227 as adapted in State 1115.

In another aspect of State 1115, the Product Size Module 560 retrieves the proper set of available product color options for the Selected Product from the Size database 562 and constrains the Product Size interface 228 accordingly. The product size constraint is determined from the corresponding entry in the Product Record for the Selected Product, in the same manner as is discussed above for the Message Entry. In State 1160, the customer accesses the Product Size interface 228. The customer then selects one of the product size options presented in the Product Size interface 228 as adapted in State 1115.

In another aspect of State 1115, the Product Quantity Module 570 retrieves the proper set of available product quantity options for the Selected Product from the Quantity database 572 and constrains the Product Size interface 229 accordingly. The product size constraint is determined from the corresponding entry in the Product Record for the Selected Product, in the same manner as is discussed above for the Message Entry. In State 1165, the customer accesses the Product Color interface 229. The customer then selects one of the product quantity options presented in the Product Quantity interface 229 as adapted in State 1115.

In State 1170, the customer selects either the Shopping Cart button 252 or the Check Out button 255 in order to purchase the personalized product just created.

In State 1172, the web site 130 conducts a "post-design process." If the vendor who will be creating the personalized product has not already been determined, that vendor is determined at this point. The design components created using the Personalization Palette 150 are converted into a format compatible with the needs of that vendor. Image formats may be converted using well-known software, such as Markzware MarkzScout™. Similarly, color information must generally be converted from the original image color scheme to the scheme used by the vendors. The manner in which the post-production format conversion is carried out is discussed in greater detail in the related application, "Personalization Format Converter," filed concurrently with the present application and identified above.

Figure 14A:
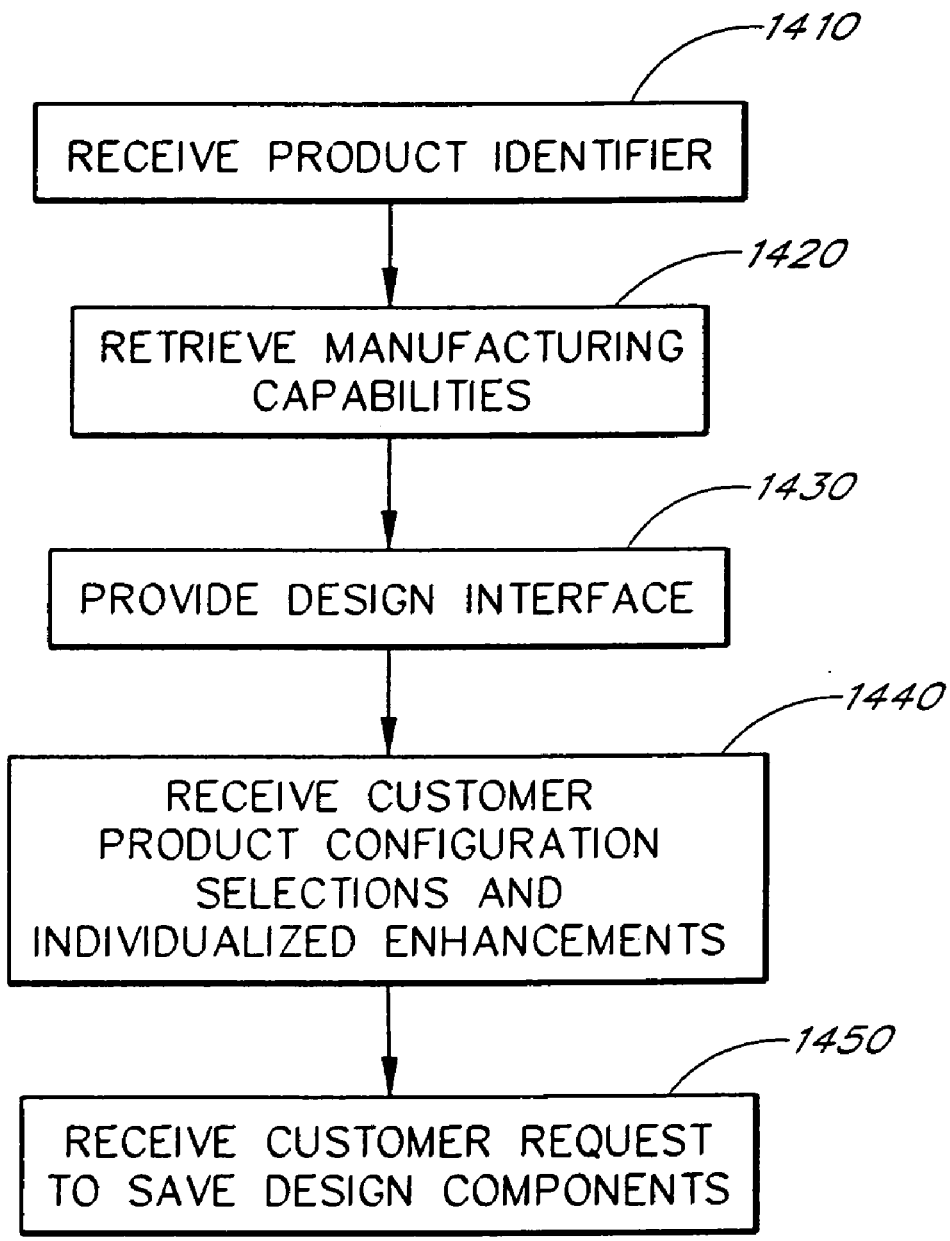
FIGS. 14A and 14B are flow charts depicting embodiments of generalized methods for designing a personalized product.
Figure 14B:
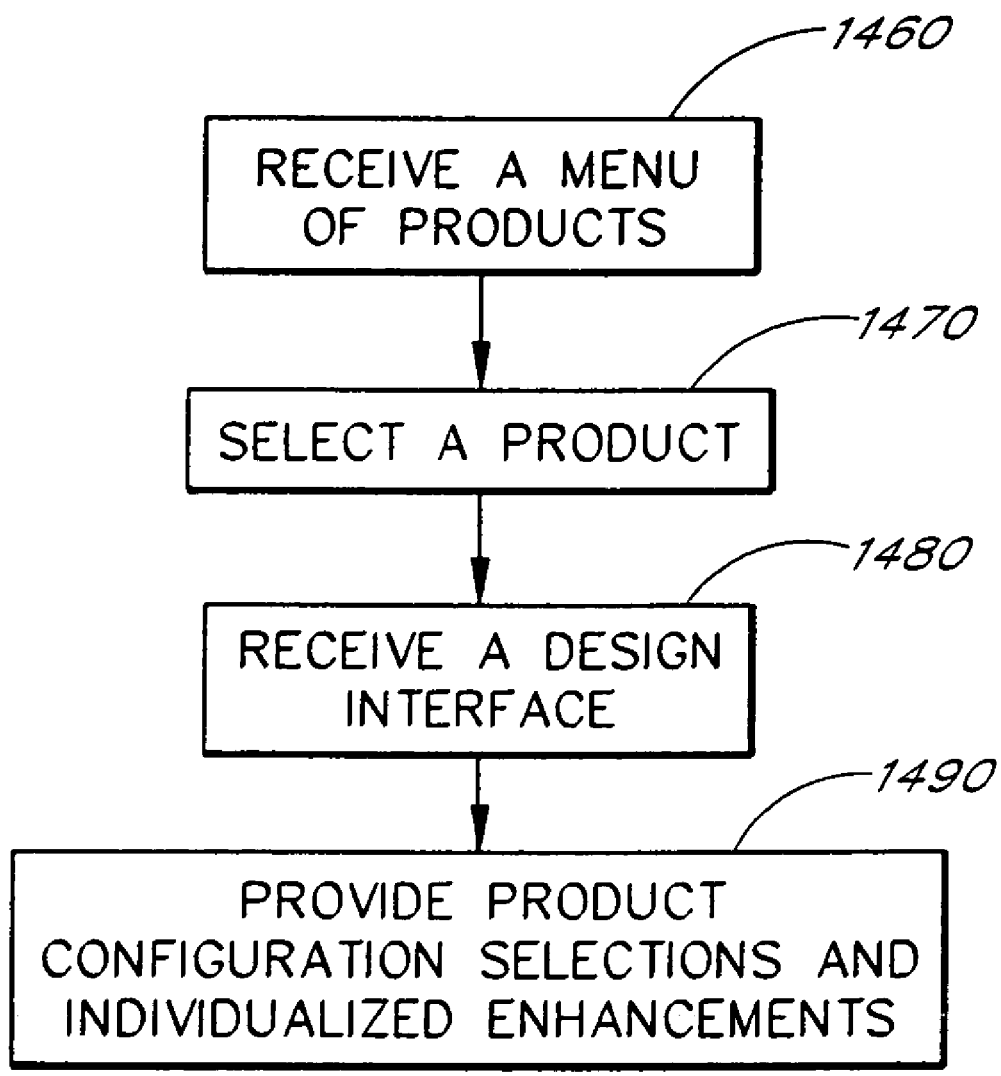

FIGS. 14A and 14B present generalized flow diagrams illustrating methods by which a personalized product may be designed. FIG. 14A depicts one embodiment of a method carried out by the host merchant of the web site 130. In state 1410, the host merchant receives a product identifier for a product to be personalized. This may come from a customer making a selection from a selection of products provided by the host merchant, as discussed above, or it may come from another source. In state 1420, the host merchant retrieves the manufacturing capabilities of vendors for the product identified in state 1410. In state 1430, the host merchant provides a design interface, such as the Personalization Palette Page 200 of FIG. 2, to the customer. As discussed above, this design interface includes design tools conformed to incorporate the manufacturing capabilities retrieved in state 1420. In state 1440, the host merchant receives product configuration options (e.g., product color, size, etc.) and individualized enhancements (e.g., an uploaded image, image positioning, created text, text color, etc.) from the user via the design interface.

In state 1450, if appropriate, the host merchant stores one or more files (e.g., XML files) embodying a set of design components in response to a customer request. Alternatively, in state 1450 the host merchant begins the post-design process in response to a customer request (i.e., a request to purchase of the personalized product).

FIG. 14B depicts one embodiment of a method carried out by a customer, such as a visitor to the web site 130. In state 1460, the customer receives an assortment of product selection choices. This may come from a menu or a hypertext directory, as discussed above, or it may come in another form. In state 1470, the customer selects a product from the assortment received in state 1460. In state 1480, the customer receives a design interface, such as the Personalization Palette Page 200 of FIG. 2. As discussed above, this design interface is adapted to incorporate the manufacturing capabilities associated with the product selected in state 1470. In state 1490, the customer provides product configuration options and individualized enhancements via the design interface. From there, the customer may optionally request to save a set of design components created in state 1490, or the customer may request that a product incorporating the design components be manufactured.

E. Adapting Existing Personalized Designs to Manufacturing Capabilities

Figure 15:
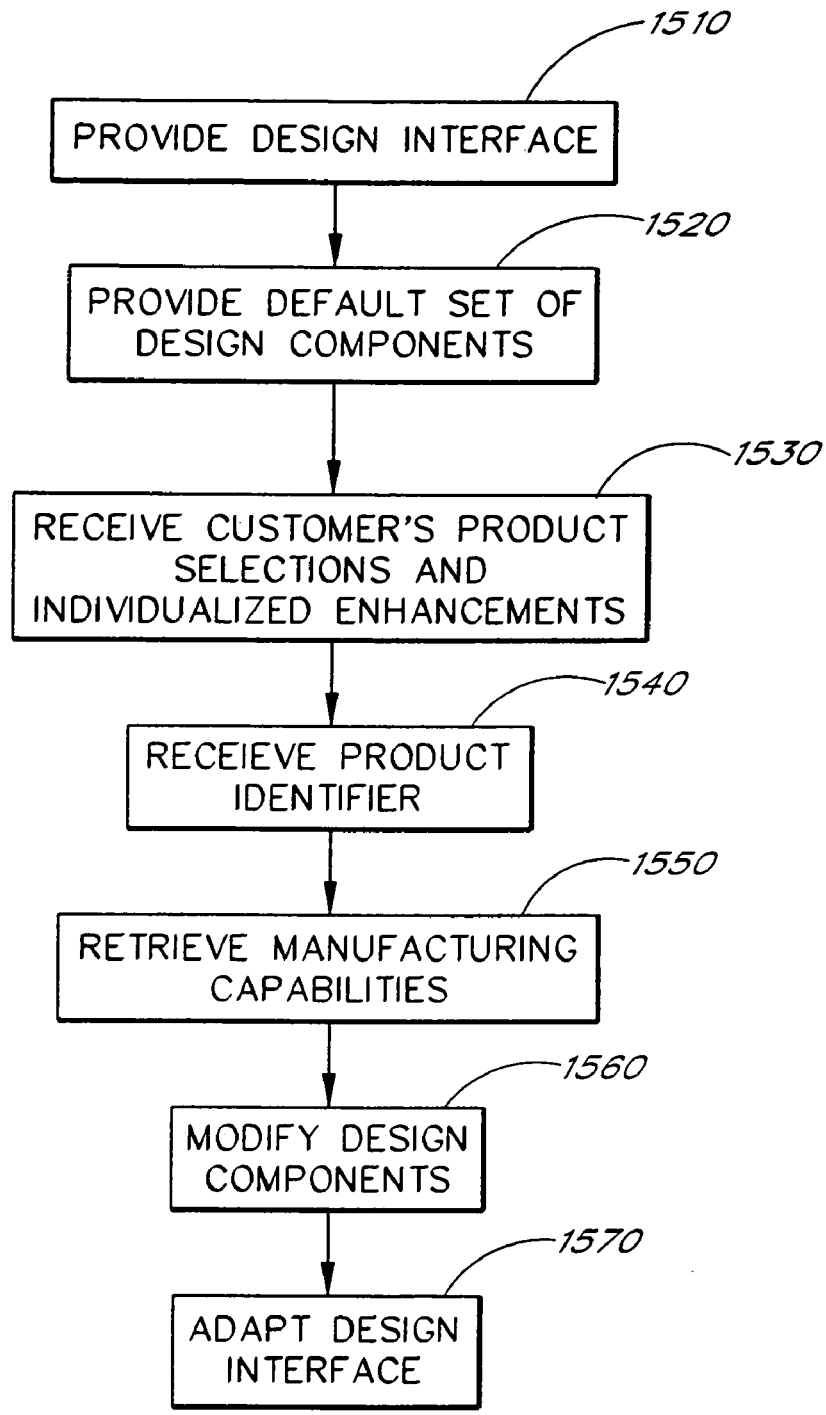
FIG. 15 is a flow chart depicting a method of a host merchant facilitating the design of a personalized product.

The above discussion applies for those customers who select a product to be personalized before they utilize the Personalization Palette Page 200 to create a personalized design. A customer, however, may opt to create a design before he or she has selected a product within which to incorporate his or her design. In this scenario, the Personalization Palette Page 200 necessarily cannot place product-based constraints on the various design components as discussed above. FIG. 15 depicts one embodiment of a method carried out by the host merchant of the web site 130 for this scenario.

In state 1510, the host merchant provides a design interface, such as the Personalization Palette Page 200 of FIG. 2, to the customer. As discussed above, this design interface is normally adapted to incorporate the manufacturing capabilities of vendors of the product to be personalized. Here, however, no such product has been selected. Instead, in state 1510, the host merchant provides to the customer a default set of capabilities unassociated with any particular product.

In one embodiment, these settings correspond to all possible manufacturing capabilities possessed by all vendors of all products of the web site 130, considered collectively. In another embodiment, these settings correspond to a predetermined set of constraints unrelated to vendor manufacturing capabilities. In still another embodiment, the settings correspond to a template previously selected by the customer. For example, that template which the customer has selected most often in his past use of the Personalization Palette Page 200 may be used. Alternatively, that template which the customer used in his previous design effort may be used.

In state 1520, the host merchant provides a template to the customer. As discussed above, this template is normally determined by the product to be personalized. Here, however, no such product has been selected. Instead, in state 1520, the host merchant provides to the customer a default template unassociated with any particular product.

In state 1530, the host merchant receives product configuration options and individualized enhancements from the user via the design interface. In state 1540, the host merchant receives a product identifier for a product to be personalized. This may come from a customer making a selection from a selection of products provided by the host merchant, as discussed above, or it may come from another source. In state 1550, the host merchant retrieves the manufacturing capabilities of vendors for the product identified in state 1540.

In state 1560, the host merchant modifies the design components received in state 1530 to comply with the manufacturing capabilities received in state 1550. The Personalization Palette 150 adapts the design components by first checking each design component for compliance with the Product Record capabilities associated with the Selected Product. Those design components that fall within the capabilities (i.e., that are within the capabilities of the vendors of the Selected Product), are left unchanged. Those design components that fall outside of the capabilities (i.e., that are outside the capabilities of the vendors) are modified to new design components that comply with the capabilities while providing the smallest design change from the original selection.

Modifying design components to comply with constraints will sometimes be unambiguous. For example, if the customer originally selected a 56-point font, but the vendors can only handle up to a 48-point font, the Personalization Palette will simply modify the design component to incorporate the largest font available, that is, the 48-point font. In other cases, however, the proper design component in compliance cannot be unambiguously determined. If, for example, the customer originally selected a Courier font, and the vendors do not support such a font, it is unclear which supported font would be the customer's next preferred choice. In one embodiment, the Personalization Palette 150 resolves this ambiguity by prompting the customer to make a selection (e.g., by selecting a choice from a pulldown menu of supported fonts). In another embodiment, the Personalization Palette 150 resolves the ambiguity by selecting a default typestyle that is supported. A customer who is unsatisfied with the default font could still modify the typestyle setting through the Typestyle interface 223, as discussed above.

The Personalization Palette may also need to "fill in gaps" in the design component set. If the customer, for example, selects a T-shirt as the Selected Product for his or her design, the new design requires positioning information to determine whether the design is placed on the front of the shirt, the back of the shirt, or on the sleeve. And, if it is placed on the front of the shirt, whether it is placed in the middle, on the left or right, and so on. In one embodiment, the Personalization Palette 150 resolves this ambiguity by prompting the customer to make the selection. In another embodiment, the Personalization Palette 150 resolves the ambiguity by selecting a default position within the capabilities of the vendors. A customer who is unsatisfied with a default setting can still modify settings as discussed above.

In state 1570, the design interface provided in state 1510 is adapted to incorporate the manufacturing capabilities retrieved in state 1550. This adaptation is analogous to that discussed generally above with the help of FIG. 11. States 1550 and 1560 may occur in any order, or contemporaneously.

If appropriate, the host merchant may receive new or modified design components from the customer. Furthermore, the host merchant may save a set of design components in response to a request from the customer. Additionally, the host merchant may forward a set of design components to the post-design process 1172 in response to a request from the customer.

Figure 16:
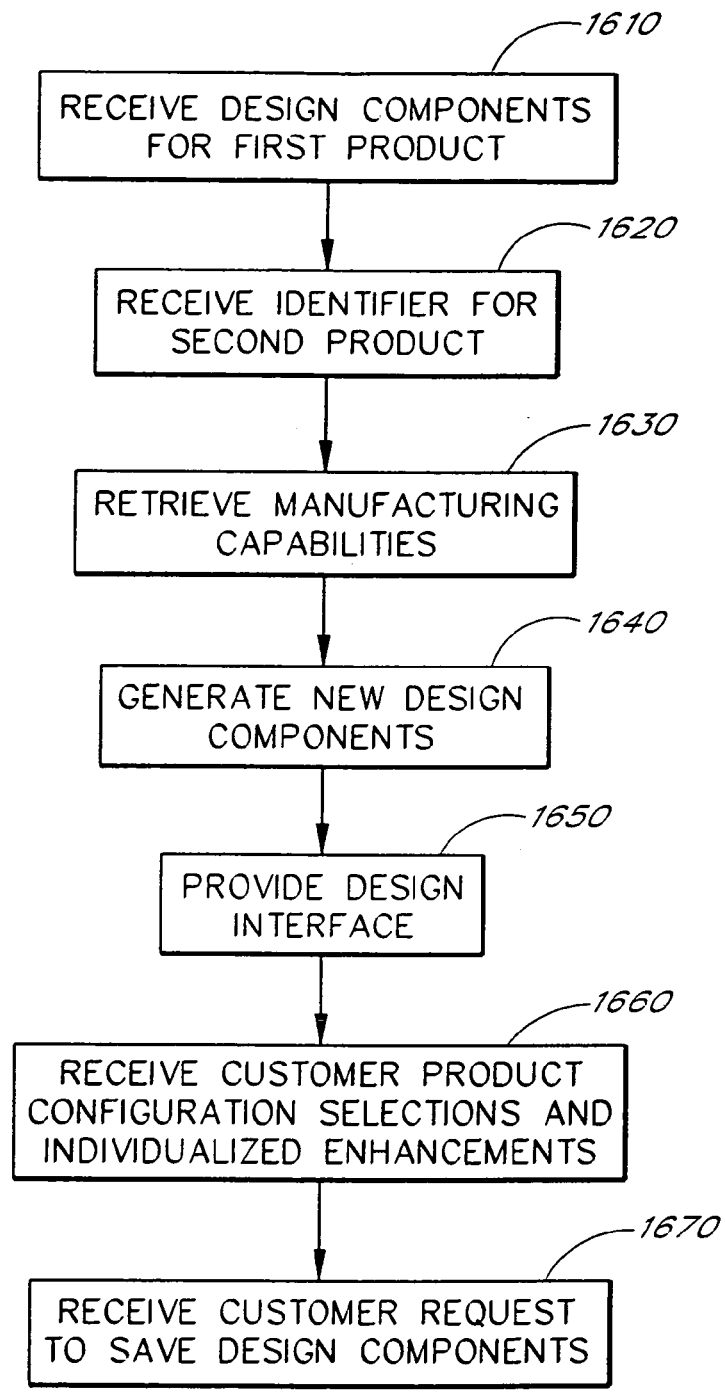
FIG. 16 is a flow chart depicting a method of a host merchant facilitating the design of a personalized product.

Another way a customer may utilize the Personalization Palette Page 200 is to apply a design created previously for one product (and saved in the customer's Personal Gallery database 330) to a different Selected Product. For example, the customer may design a company logo for use on a business card, and later decide to use the logo on a T-shirt. FIG. 16 depicts one embodiment of a method carried out by the host merchant of the web site 130 for this scenario.

In state 1610, the host merchant receive a set of design components for a first product (e.g., the business card). This set of design components may come from uploading a preexisting product design created earlier using the design interface of the host merchant (e.g., the Personalization Palette Page 200 on the web site 130), or it may have been created using an independent design interface.

In state 1620, the host merchant receives a product identifier for a second product (e.g., the T-shirt) to be personalized. This may come from a customer making a selection from an assortment of product choices provided by the host merchant, as discussed above, or it may come from another source.

In state 1630, the host merchant retrieves the manufacturing capabilities of vendors for the product identified in state 1620. In state 1640, the host merchant modifies the design components received in state 1610 to comply with the manufacturing capabilities received in state 1630. This modification of design components is analogous to that discussed above for state 1560.

In state 1650, a design interface (e.g., the Personalization Palette Page 200) is created incorporating design tools conformed to the manufacturing capabilities retrieved in state 1630. This creation is analogous to that discussed generally above with the help of FIG. 11.

In state 1660, the host merchant receives product configuration options and individualized enhancements from the user via the design interface. In state 1670, if appropriate, the host merchant stores one or more files (e.g., XML files) embodying a set of design components in response to a customer request. Alternatively, in state 1670 the host merchant begins the post-design process in response to a customer request (i.e., a request to purchase of the personalized product).

Although this invention has been described in terms of certain preferred embodiments, other embodiments that are apparent to those of ordinary skill in the art are also within the scope of this invention. Accordingly, the scope of the present invention is intended to be defined only by reference to the appended claims.

What is claimed is:

1. A method of facilitating the creation of personalized products, for use in a system where a user on a user computer can access at least one host merchant computer via a communication network, the host merchant computer including a web server in communication with a products database containing information on products available for personalization and further containing manufacturing capabilities of a plurality of vendors capable of producing the products available for personalization, the method comprising:

providing to the user via said communication network at least one web page providing an assortment of product selections for products in the products database, wherein the products database contains two or more products, and one or more products available in the products database are associated with manufacturing capabilities of two or more vendors, capable of producing the product, wherein said manufacturing capabilities comprise user contributed individual enhancements of the product;

receiving a message from the user via said communication network indicating a selection of a selected product from said assortment of product selections, the selected product being associated with the manufacturing capabilities of two or more vendors capable of producing the selected product;

retrieving a set of manufacturing capabilities for the selected product from the products database, the set of manufacturing capabilities including manufacturing capabilities of said two or more vendors capable of producing the selected product;

providing to the user via said communication network a design interface, said design interface comprising at least one web page including at least one design tool that allows the user to select configuration options and to create the individualized enhancements for the selected product, wherein said design tool is configured to constrain at least one configuration option available in said design interface in response to a user selection of a configuration option so as to only allow the user to select further configuration options and create individualized enhancements such that the user selected a set of configuration options and created a set of individualized enhancements for the selected product are within the manufacturing capabilities retrieved from the database of at least one vendor of said two or more vendors capable of producing the selected product;

receiving from fine user via said design interface the set of selected configuration options and the set of individualized enhancements for the selected product;

selecting a vendor from said two or more vendors, the selected vendor being capable of producing the selected product personalized with the set of selected configuration options and the set of individualized enhancements;

converting the set of selected configuration options and the set of individualized enhancements for the selected product into a file having a format compatible with the needs of the selected vendor; and communicating the file to the selected vendor.

2. The method of claim 1, wherein said individualized enhancements include a pictorial image incorporated onto said selected product with an image position determined by the user.

3. The method of claim 1, wherein said individualized enhancements include a text message incorporated onto said selected product with a text position determined by the user.

4. The method of claim 1, further comprising:
receiving a search query from the user via said communication network; and
presenting to the user via said communication network an assortment of digital image selections retrieved from at least one digital image database in communication with said design interface, wherein said assortment satisfies said search query.

5. The method of claim 4, further comprising:
receiving from said user via said communication network a selected image from said assortment of digital image selections; and
incorporating said selected image into said set of individualized enhancements using said design tool.

6. The method of claim 1, further comprising:
receiving a search query from the user via said communication network; and
presenting to the user via said communication network an assortment of text message selections retrieved from at least one text message database in communication with said design interface, wherein said assortment satisfies said search query.

7. The method of claim 6, further comprising:
receiving from said user via said communication network a selected text message from said assortment of text message selections; and
incorporating said selected text message into said set of individualized enhancements using said design tool.

8. The method of claim 1, further comprising:
receiving from the user via said communication network a request to save said set of product configurations and said set of individualized enhancements for the said selected product; and
storing said set of product configuration selections and said set of individualized enhancements in a location accessible to that user via said communication network.

9. A method of facilitating the creation of personalized products, for use in a system where a user on a user computer can access at least one host merchant computer via a communication network, the method comprising:
providing an assortment of product selections to the user via said communication network;
receiving a message from the user via said communication network indicating a selection of a product from said assortment of product selections;
retrieving a set of manufacturing capabilities for the selected product from the products database, the set of manufacturing capabilities including the manufacturing capabilities of two or more vendors, capable of producing the selected product, wherein said manufacturing capabilities comprise user contributed individual enhancements of the selected product;
providing to the user via said communication network a design interface, said design interface comprising at least one design tool that allows the user to select configuration options and to create the individualized enhancements for the selected product, and wherein said design tool is configured to constrain at least one configuration option available in said design interface in response to a user selection of a configuration option so as to allow the user to only select further configuration options and created individualized enhancements such that the user selected a set of configuration options and created a set of individualized enhancements are within the manufacturing capabilities retrieved from the database of at least one vendor of the two or more vendors capable of producing the selected product;
receiving from the user via said communication network a request to save the set of selected configurations options and the set of individualized enhancements for the selected product;
storing said set of selected configuration options and said set of individualized enhancements for the selected product in a location accessible to that user via said communication network;
converting the set of selected configuration options and said set of individualized enhancements for the selected product into a file having a format compatible with the needs of at least a first vendor capable of producing the selected product; and
communicating the file to at least the first vendor.

10. The method of claim 9, further comprising receiving from the user via said design interface a set of product configuration options and a set of individualized enhancements for said selected product.

11. The method of claim 9, wherein said individualized enhancements include a pictorial image incorporated onto said selected product with an image size, image position, and image orientation determined by the user.

12. The method of claim 9, wherein said individualized enhancements include a text message incorporated onto said selected product with a font, text color, text size, text position, and text orientation determined by the user.

13. The method of claim 9, wherein said design interface presents to the user a default set of product configuration options and a default set of enhancements.

14. The method of claim 9, further comprising:
receiving a search query from the user via said communication network; and
presenting to the user via said communication network an assortment of digital image selections retrieved from at least one digital image database in communication with said design interface, wherein said assortment satisfies said search query.

15. The method of claim 14, further comprising:
receiving from said user via said communication network a selected image from said assortment of digital image selections; and
incorporating said selected image into said set of individualized enhancements using said design tool.

16. The method of claim 11, further comprising:
receiving a search query from the user via said communication network; and
presenting to the user via said communication network an assortment of text message selections retrieved from at least one text message database in communication with said design interface, wherein said assortment satisfies said search query.

17. The method of claim 16, further comprising:
receiving from said user via said communication network a selected text message from said assortment of text message selections; and
incorporating said selected text message into said set of individualized enhancements using said design tool.

18. A method of facilitating the creation of personalized products, comprising:
- receiving from a user via a communication network a first set of design components created for a first product, said first set of design components corresponding to configuration options and individualized enhancements;
- receiving from the user via said communication network an identifier for a second product selected for personalization;
- retrieving a set of manufacturing capabilities for the selected product, the set of manufacturing capabilities including the manufacturing capabilities of two or more vendors, capable of producing the selected second product wherein said manufacturing capabilities comprise user contributed individualized enhancements of the product;
- generating a second set of design components derived from said first set of design components, wherein each component of said second set of design components complies with the set of manufacturing capabilities;
- providing to the user a design interface comprising at least one design tool enabling the user to modify said design components, wherein said design interface is configured to constrain at least one configuration option available in said design interface in response to a user selection of a configuration option so as to only allow the user to select further configuration options and create individualized enhancements such that the user selected a set of configuration options and a set of created individualized enhancements are within the set of manufacturing capabilities of at least one of said two or more vendors capable of producing the selected product;
- receiving from the user via said design interface the set of selected configuration options and the set of created individualized enhancements for said selected product;
- selecting a vendor capable of producing the selected product with the set of selected configuration options and the set of created individualized enhancements;
- converting the set of selected configuration options and the set of individualized enhancements into a file having a format compatible with the needs of the selected vendor; and
- communicating the file to the selected vendor.

19. The method of claim 18, wherein receiving an identifier for a second product comprises:
- providing to a user via said communication network an assortment of product selections available for personalization; and
- receiving from the user via said communication network an identifier for a second product selected from said assortment.

20. The method of claim 18, further comprising:
- receiving a search query from the user via said communication network; and
- presenting to the user via said communication network an assortment of image selections retrieved from at least one image database in communication with said design interface, wherein said assortment satisfies said search query.

21. The method of claim 18, further comprising:
- receiving from the user a search query; and
- presenting to the user an assortment of text message selections retrieved from at least one text message database in communication with said design interface, wherein said assortment satisfies said search query.

22. The method of claim 18, further comprising:
- receiving from the user via said communication network a request to save said first set of design components; and
- storing said first set of design components in a location accessible to that user for later use by that user.

23. A method of facilitating the creation of personalized products, for use in a system where a user on a user computer can access at least one host merchant computer via a communication network, the method comprising:
- providing to the user via said communication network a design interface, said design interface comprising at least one design tool that allows the user to select configuration options and to create individualized enhancements, said configuration options and individualized enhancements comprising design components;
- receiving a first set of design components corresponding to a first set of individualized enhancements from the user via said design interface before a product to be personalized has been identified;
- receiving an identifier for a product selected for personalization from the user via said communication network;
- retrieving a set of manufacturing capabilities for the selected product from a products database, the set of manufacturing capabilities comprising the manufacturing capabilities of two or more vendors capable of producing the selected product, wherein said manufacturing capabilities comprise user contributed individualized enhancements of the selected product;
- generating a second set of design components derived from said first set of design components, wherein each component of said second set of design components complies with said set of manufacturing capabilities;
- loading said second set of design components into said design interface; and
- adapting said design interface to constrain at least one configuration option available in said design interface in response to a user selection of a configuration option so as to only allow the user to select further configuration options and create individualized enhancements such that the user selected configuration options and created individualized enhancements are within the manufacturing capabilities retrieved from the database of at least one of said two or more vendors capable of producing the product.

24. The method of claim 23, wherein receiving an identifier for a product comprises:
- providing to a user via said communication network an assortment of product selections available for personalization; and
- receiving from the user via said communication network an identifier for a second product selected from said assortment.

25. The method of claim 23, further comprising receiving individualized enhancements and selections of product configuration options from the user via said design interface.

26. The method of claim 23, further comprising:
- receiving a search query from the user via said communication network; and
- presenting to the user via said communication network an assortment of image selections retrieved from at least one image database in communication with said design interface, wherein said assortment satisfies said search query.

27. The method of claim 23, further comprising:
receiving a search query from the user via said communication network; and
presenting to the user via said communication network an assortment of text message selections retrieved from at least one text message database in communication with said design interface, wherein said assortment satisfies said search query.

28. The method of claim 23, further comprising:
receiving from the user via said communication network a request to save said first set of design components; and
storing said first set of design components in a location accessible to that user via said communication network for later use by that customer.

29. A method of designing a personalized product, for use in a system where a user on a user computer can access at least one host merchant computer via a communication network, the host merchant computer including a web server in communication with products database containing information on products available for personalization and further containing manufacturing capabilities associated with two or more vendors capable of producing the products, the method comprising:
receiving from the host merchant via said communication network at least one web page providing an assortment of product selections available for personalization;
selecting a product from said assortment using a web-based selection tool;
receiving a design interface from a host merchant via said communication network, said design interface comprising at least one web page including at least one design tool that allows the user to select configuration options and to create individualized enhancements, and wherein said design tool is configured to constrain at least one configuration option available in said design interface in response to a user selection of a configuration option so as to only allow the user to select further configuration options and create individualized enhancements such that the user selected configuration options and created individualized enhancements are within the manufacturing capabilities retrieved from the database of at least one vendor said two or more vendors capable of producing the selected product wherein said manufacturing capabilities comprise user contributed individualized enhancements of the product;
creating at least one individualized enhancement for said selected product using said design interface;
sending the at least one individualized enhancement for said selected product to the host merchant computer;
selecting a vendor capable of producing the selected product personalized with the set of configuration options and the at least one individualized enhancement;
converting the at least one individualized enhancement into a file having a format compatible with the needs of the selected vendor; and
sending the file from the host computer to the selected vendor.

30. The method of claim 29, wherein said individualized enhancement includes a pictorial image incorporated onto said selected product with an image position determined by the user.

31. The method of claim 29, wherein said individualized enhancement includes a text message incorporated onto said selected product with a text position determined by the user.

32. A system to allow a user to design personalized products, the system accessible to a user on a user computer via a communication network, the system comprising:
a server configured to communicate with said communication network;
an executable products database embedded in a computer readable medium in communication with said server, said products database comprising information on products available for personalization, and further comprising manufacturing capabilities of two or more vendors, producing the products, wherein said manufacturing capabilities comprise user contributed individualized enhancements of the product;
a personalized product module configured to communicate with said products database, said personalized product module presenting selections for products to the user, and said personalized product module further receiving an identifier of a selected product from the user;
a set of design tools configured to communicate with said personalized product module and allowing the user to select configuration options and create individualized enhancements for the selected product, wherein said set of design tools is configured to constrain at least one configuration option available in response to a user selection of a configuration option so as to only allow the user to select further configuration options and create individualized enhancements such that the user selected configuration options and created individualized enhancements are within the manufacturing capabilities of at least one vendor of the two or more vendors capable of creating the selected product; and
a design buffer configured to communicate with said set of design tools, said design buffer configured to contain configuration options and individualized enhancements generated by the user via said set of design tools during a current design session.

33. The system of claim 32, further comprising a product browse tool in communication with said products database, wherein said product browse tool enables a user to browse said assortment of product selections of said products database.

34. The system of claim 32, further comprising a product search tool in communication with said products database, wherein said product search tool enables a user to search said assortment of product selections of said products database for products associated with a search query.

35. The system of claim 32, further comprising an image browse tool in communication with said image databases, wherein said image browse tool enables a user to browse said assortment of digital image selections of said image databases.

36. The system of claim 32, further comprising an image search tool in communication with said image databases, wherein said image search tool enables a user to search said assortment of digital image selections of said image databases for images associated with a search query.

37. The system of claim 32, further comprising:
a message database in communication with said set of design tools, said message database comprising an assortment of text message selections; and
a message browse tool in communication with said message database, wherein said message browse tool enables a user to browse said assortment of text message selections of said message database.

38. The system of claim 37, further comprising a message search tool in communication with said message database, wherein said message search tool enables a user to search said assortment of text message selections of said message database for text messages associated with a search query.

39. The system of claim 32, further comprising:
a personal database in communication with said set of design tools, said personal database being accessible only by a particular customer,
a save tool in communication with said personal database, said save tool configured so as to allow the particular user to save design information from said design buffer into said personal database; and
an upload tool in communication with said personal database, said upload tool configured so as to allow the particular user to upload design information from said personal database into said design buffer.

40. The system of claim 32, further comprising;
a template database in communication with said set of design tools, said template database comprising default sets of design components for each product of said product database; and
a template module in communication with said template database that generates a default set of design components for a particular product selected by the user for presentation to the user at the beginning of the design process.

41. A system to allow a user to design personalized products, the system accessible to a user on a user computer via a communication network, the system comprising:
an executable products database embedded in a computer readable medium comprising information on one or more products available for personalization, and further comprising manufacturing capabilities of two or more vendors capable of creating the one or more products, wherein said manufacturing capabilities comprise user contributed individualized enhancements of the product,
a first module configured to communicate with said products database, said first module receiving an identifier of a selected product from a user; and
a second module configured to communicate with said first module, said second module comprising at least one design tool that allows the user to select configuration options and create individualized enhancements, wherein said design tool is configured to constrain at least one configuration option available in said design interface in response to a user selection of a configuration option so as to only allow the user to select further configuration options and create individualized enhancements such that the user selected configuration options and created enhancements are within the manufacturing capabilities of at least one vendor of the two or more vendors capable of creating the selected product.

42. The system of claim 41, further comprising a product browse tool in communication with said products database, wherein said product browse tool enables a user to browse said assortment of product selections of said products database.

43. The system of claim 41, further comprising a product search tool in communication with said products database, wherein said products search tool enables a user to search said assortment of product selections for products associated with a search query.

44. The system of claim 41, further comprising at least one image database in communication with said second module, said image databases comprising an assortment of digital image selections.

45. The system of claim 41, further comprising an image browse tool in communication with said image databases, wherein said image browse tool enables a user to browse said assortment of digital image selections of said image databases.

46. The system of claim 41, further comprising an image search tool in communication with said image databases, wherein said image search tool enables a user to search said assortment of digital image selections for images associated with a search query.

47. The system of claim 41, further comprising:
a message database comprising an assortment of text message selections; and
a message browse tool in communication with said message database, wherein said message browse tool enables a user to browse said assortment of text message selections of said message database.

48. The system of claim 41, further comprising a message search tool in communication with said message database, wherein said message search tool enables a user to search said assortment of text message selections of said message database for text messages associated with a search query.

49. The system of claim 41, further comprising:
a personal database accessible only by a particular customer;
a save tool in communication with said personal database, said save tool configured so as to allow the particular user to save design information from said design database into said personal database; and
an upload tool in communication with said personal database, said upload tool configured so as to allow the particular user to upload design information from said personal database into said design database.

50. The system of claim 41, further comprising:
a template database comprising default sets of design components for each product of said product database; and
a template module in communication with said template database that generates a default set of design components for a particular product selected by the user, for presentation to the user at the beginning of the design process.

* * * * *

UNITED STATES PATENT AND TRADEMARK OFFICE
CERTIFICATE OF CORRECTION

PATENT NO. : 7,216,092 B1 Page 1 of 1
APPLICATION NO. : 09/550354
DATED : May 8, 2007
INVENTOR(S) : Weber et al.

It is certified that error appears in the above-identified patent and that said Letters Patent is hereby corrected as shown below:

Drawing, At Sheet 16 of 17, FIG. 15, Reference Numeral 1540, Delete "RECEIEVE" and insert -- RECEIVE --, therefor.
At Column 1, line 12, Delete "09/555,010," and insert -- 09/550,010, --, therefor.
At Column 10, line 63, Delete "Paint Shop Pro$^{TM}$" and insert -- Paint Shop Pro$^{TM}$, --, therefor.
At Column 26, line 7, Delete "Pt." and insert -- pt. --, therefor.
At Column 29, lines 44-45, Delete "Verdana.font." and insert -- Verdana font. --, therefor.
At Column 30, line 20, Delete "Click-To-Personalize" and insert
-- Click-to-Personalize --, therefor.
At Column 36, line 23, In Claim 1, delete "vendors," and insert -- vendors --, therefor.
At Column 36, line 55, In Claim 1, delete "fine" and insert -- the --, therefor.
At Column 37, line 56, In Claim 9, delete "vendors," and insert -- vendors --, therefor.
At Column 38, line 2, In Claim 9, delete "created" and insert -- create --, therefor.
At Column 38, line 9, In Claim 9, delete "configurations" and insert -- configuration --, therefor.
At Column 41, line 20, In Claim 29, after "with" insert -- a --.
At Column 41, line 43, In Claim 29, after "vendor" insert -- of --.
At Column 42, line 16, In Claim 32, after "for" insert -- the --.
At Column 43, line 7, In Claim 39, delete "customer," and insert -- customer; --, therefor.
At Column 43, line 16, In Claim 40, delete "comprising;" and insert -- comprising: --, therefor.
At Column 43, lines 35-36, In Claim 41, delete "product," and insert -- product; --, therefor.

Signed and Sealed this

Thirteenth Day of November, 2007

JON W. DUDAS
*Director of the United States Patent and Trademark Office*